(12) United States Patent
Koseki et al.

(10) Patent No.: US 7,577,936 B2
(45) Date of Patent: Aug. 18, 2009

(54) OPTIMIZATION OF CONVERSION OF A CHARACTER CODING SYSTEM

(75) Inventors: Akira Koseki, Sagamihara (JP);
Michiaki Tatsubori, Yamato (JP);
Kazuaki Ishizaki, Tokyo-to (JP);
Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 11/096,548

(22) Filed: Apr. 1, 2005

(65) Prior Publication Data

US 2005/0231397 A1     Oct. 20, 2005

(30) Foreign Application Priority Data

Apr. 2, 2004     (JP)     ............................. 2004-109650

(51) Int. Cl.
*G06F 9/44*     (2006.01)
*G06F 9/45*     (2006.01)

(52) U.S. Cl. ...................... 717/108; 717/107; 717/136; 717/148; 717/152; 717/159

(58) Field of Classification Search ........................ None
See application file for complete search history.

(56) References Cited

U.S. PATENT DOCUMENTS

2005/0086584 A1 * 4/2005 Sampathkumar et al. . 715/501.1

OTHER PUBLICATIONS

Norimatsu Yasutomo, C Language General Knowledge Course, the 5th installment, Optimization Technique.

Matsuoka Yasumasa et al, "Technique for Compiler Optimization".
Mark Roberts, "Compiler Optimization Technique".
InternetURL,http://cvs.apache.org/viewcvs.cgi/xml-xerces/java/src/org/apache/xerces/impl/io/UTF8Reader.java?rev=1.7&content-type=text/vnd.viewcvs-markup.
Makino et al. Implementation and Performance of WS-Security-IBM Research Report RT0546, 2003.
Ruthing er al. "Optimal Code Motion: Theory and Practice," ACM TPLAS, 18(3), 300-324, 1996.
Bodik et al. "Complete Removal of Redudant Expressions," in proceedings of the ACM SIGPLAN 1998 Conference on Programming Language Design and Implementation, pp. 1-14, 1998.

* cited by examiner

*Primary Examiner*—Chuck O Kendall
(74) *Attorney, Agent, or Firm*—Louis P. Herzberg; Shimokaji & Associates, P.C.

(57) ABSTRACT

A compiler optimizing conversion of a character coding system for a character stored in a string variable in a target program to be optimized has a conversion instruction generation section which generates a conversion instruction to convert a character from a first character coding system to a second character coding system and to store the converted character in the string variable, the conversion instruction being generated before each of a plurality of procedures by which the character in the string variable written in the first character coding system is read out and is used in the second character coding system, and a conversion instruction removal section which removes each of conversion instructions generated by the conversion instruction generation section if a character in the second character coding system is stored in the string variable in each of the execution paths executed before the conversion instruction.

7 Claims, 14 Drawing Sheets

[Figure 1]
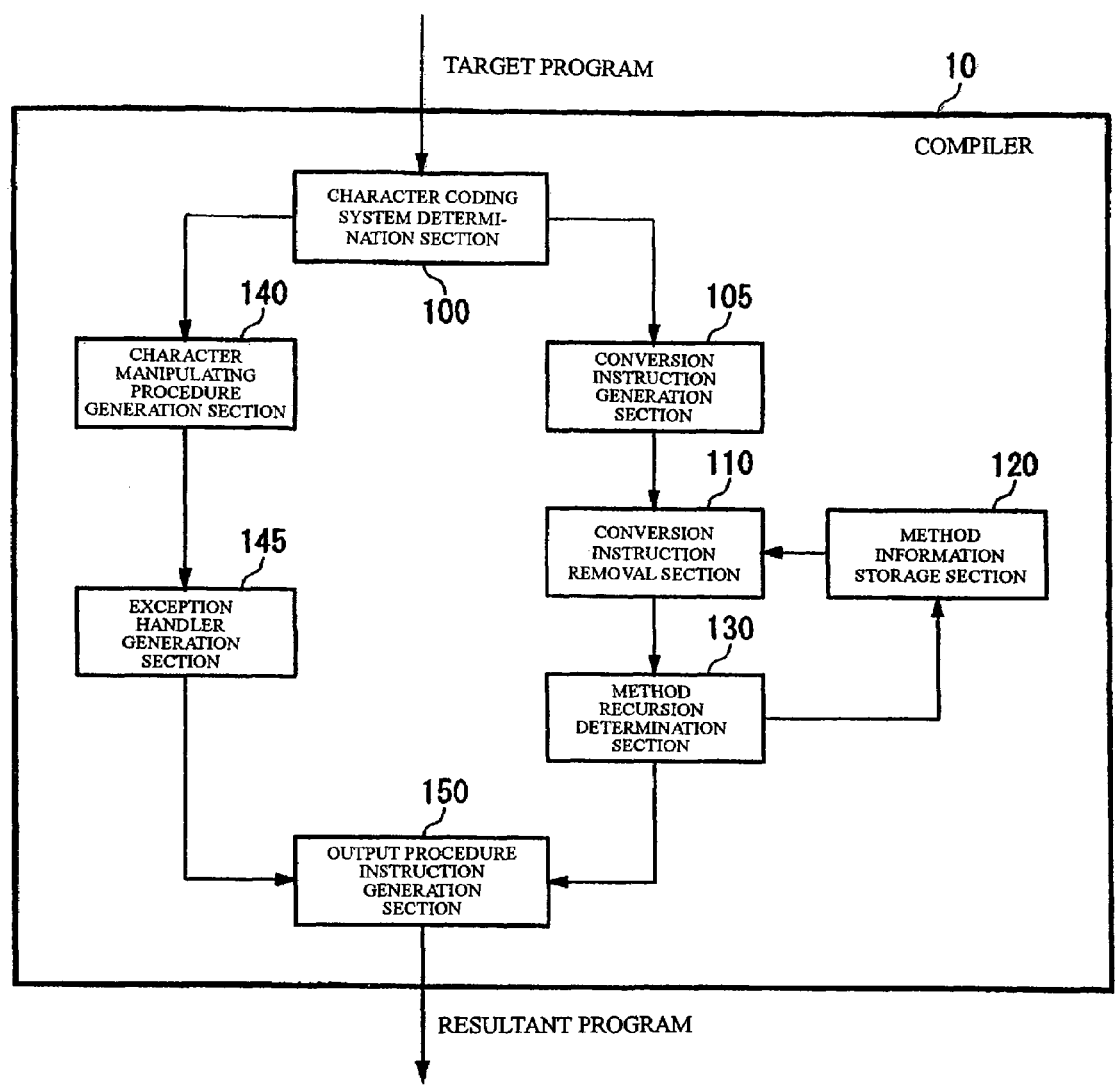

[Figure 2]
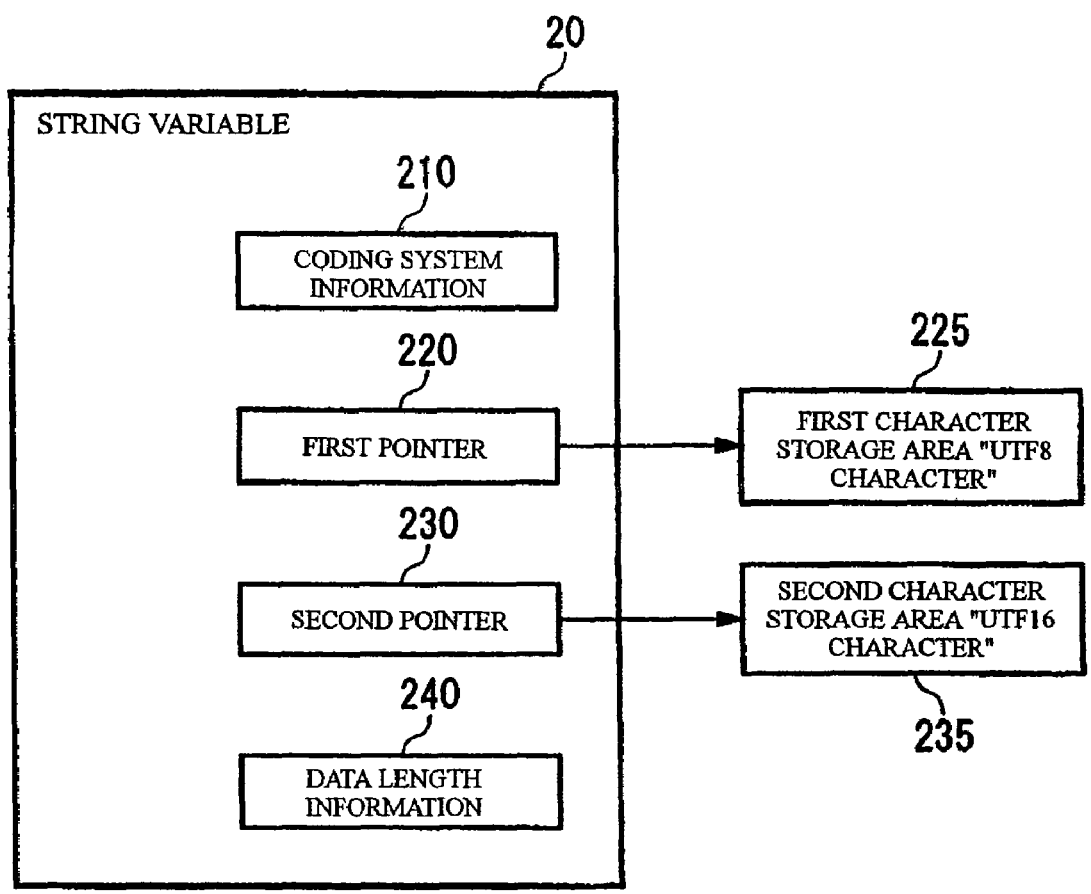

[Figure 3]
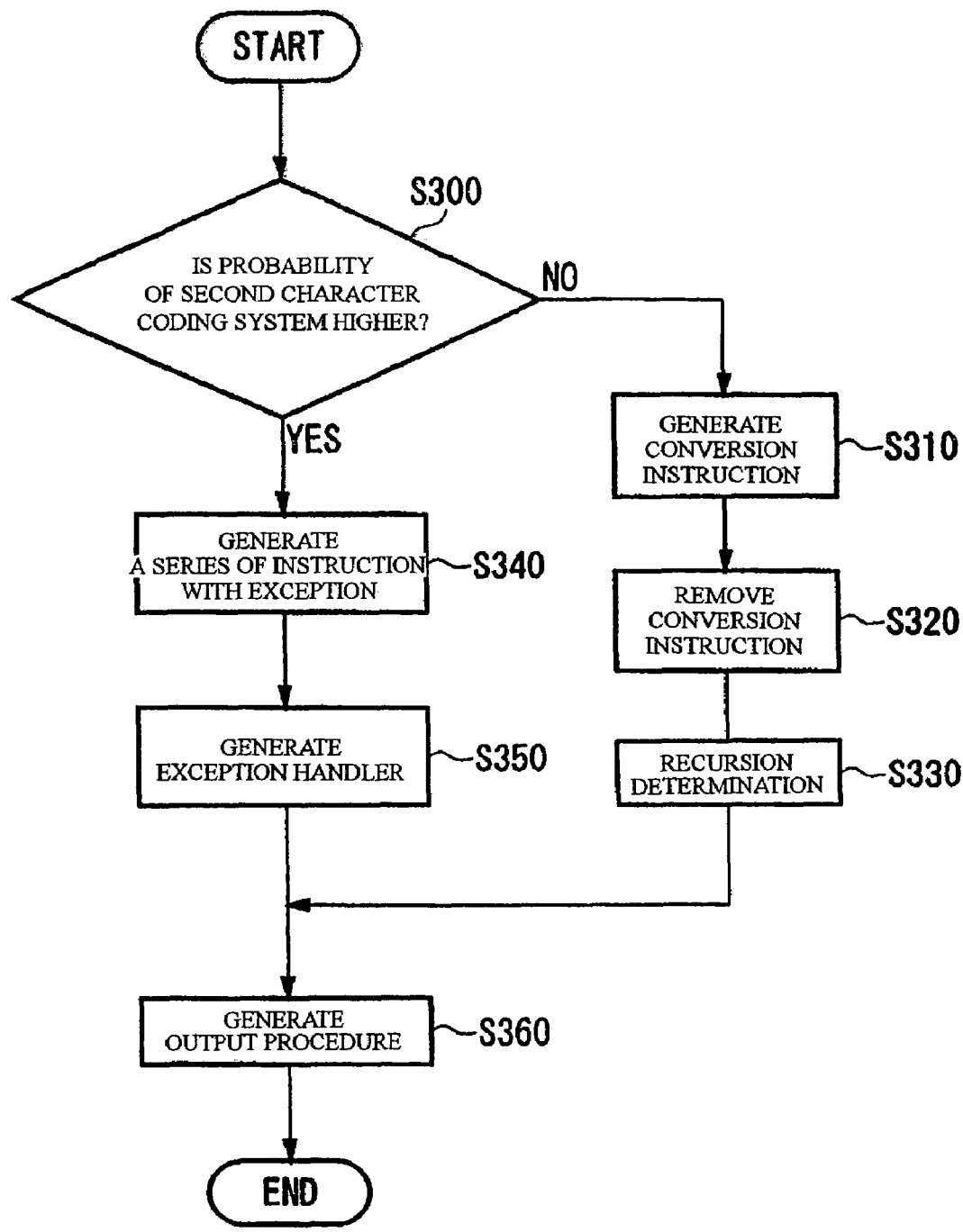

[Figure 4]

```
class OutputStreamWriter extends.... {

OutputStream out;

public void write(String str) {
    if ( OUTPUT encoding == UTF8) {
      if (UTF8String.isUTF8(str)) {
        // UTF8 UTF8 CHARACTER STRING IS OUTPUT WITHOUT BEING CHANGED
        byte[] bytes = UTF8String.getRawBytes(str);
        int len = UTF8String.getRawLength(str);
        out.write(bytes, 0, len);
      } else {
        // UTF8 OUTPUT AFTER BEING CONVERTED INTO UTF8 CHARACTER STRING
      }
    } else {
      ...
    }
  }
  ...
}
```

[Figure 5]

(a)
```
public interface ContentHandler {
   ...
   public void startElement(String namespaceURL, String localName,
                            String qName);
   ...
}
```

(b)
```
byte[] inBuf = ...;
ContentHandler handler = ...;

int offset = ...;

// Start position of element
int start = parser.proceedToStartOfStartElementLocalName(inBuf, offset);
// End position of element
int end = parser.proceedAfterEndOfStartElementLocalName(inBuf, start);

String localName;
if ( Input encoding == UTF8) {
    // creating a UTF8 String (Not format-converted)
    String localName = UTF8String.create(inBuf, start, end - start);
} else {
    // creating a UTF16 String (Format-converted)
    String localName = new String(inBuf, start, end - start, Input encoding);
} handler.startElement(..., localName, ..);
```

(c)
```
public FilingHandler implements ContentHandler {

PrintWriter out;

Filing Handler(String fileName) {
      OutputStream fileOut = new FileOutputStream(fileName);
      Writer writer = new OutputStreamWriter(fileOut, "UTF8");
      out = new PrintWriter(writer);
   } public void startElement(String namespaceURL, String localName,
                            String qName) {
      if (namespaceURL.equals("http://my.app.org/ns")) {
         ...
      }
      out.print("<");
      out.print(qName);
      ...
      out.print(">");
   }
   ...
}
```

[Figure 6]

```
byte[] inBuf = ..;

int offset = ..;

// Start position of element
int start = parser.proceedToStartOfStartElementLocalName(inBuf, offset);
// End position of element
int end = parser.proceedAfterEndOfStartElementLocalName(inBuf, start);

String localName;
if( Input encoding == UTF8) {
    // creating a UTF8 String  (Not format-converted)
    String localName = UTF8String.create(inBuf, start, end - start);
} else {
    // creating a UTF16 String (Format-converted)
    String localName = new String(inBuf, start, end - start, Input encoding);
}

// Element constituted by UTF8 character string is generated
Element elem = new ElementImpl(.., localName, ..);
```

[Figure 7]

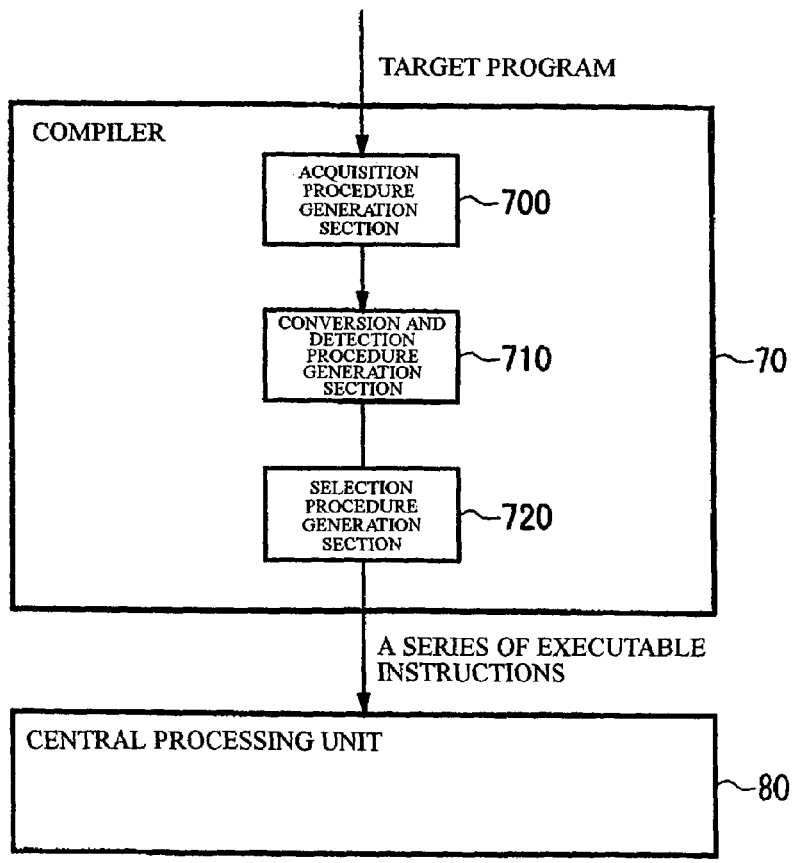

[Figure 8]

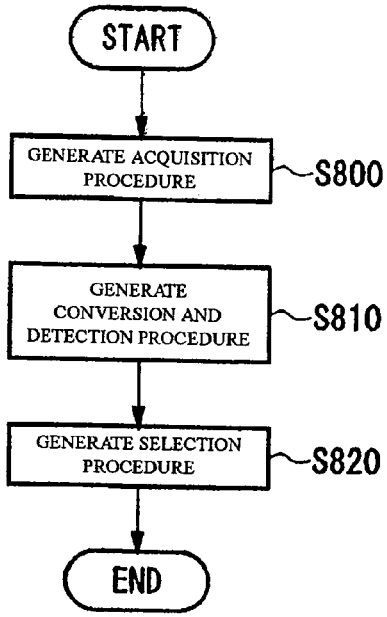

[Figure 9]

| UTF-16 | | UTF-8 | | | |
|---|---|---|---|---|---|
| Code Points | Scalar value | 1st byte | 2nd byte | 3rd byte | 4th byte |
| U+0000..U+007F | 00000000 0yyyxxxx | 00..7F 0yyyxxxx | | | |
| U+0080..U+07FF | 00000zzz yyyyxxxx | C2..DF 110zzzyy | 80..BF 10yyxxxx | | |
| U+0800..U+0FFF | 00001zzz yyyyxxxx | E0 11100000 | A0..BF 101zzzyy | 80..BF 10yyxxxx | |
| U+1000..U+D7FF, U+E000..U+FFFF | uuuuzzzz yyyyxxxx | E1..EF 1110uuuu | 80..BF 10zzzzyy | 80..BF 10yyxxxx | |
| U+10000..U+3FFFF | 00vv uuuuzzzz yyyyxxxx | F0 11110000 | 90..BF 10vvuuuu | 80..BF 10zzzzyy | 80..BF 10yyxxxx |
| U+40000..U+FFFFF | vvvv uuuuzzzz yyyyxxxx | F1..F3 111100vv | 80..8F 1000uuuu | 80..BF 10zzzzyy | 80..BF 10yyxxxx |
| U+100000..U+10FFFF | 00010000 uuuuzzzz yyyyxxxx | F4 11110100 | 80..8F 1000uuuu | 80..BF 10zzzzyy | 80..BF 10yyxxxx |

[Figure 10]
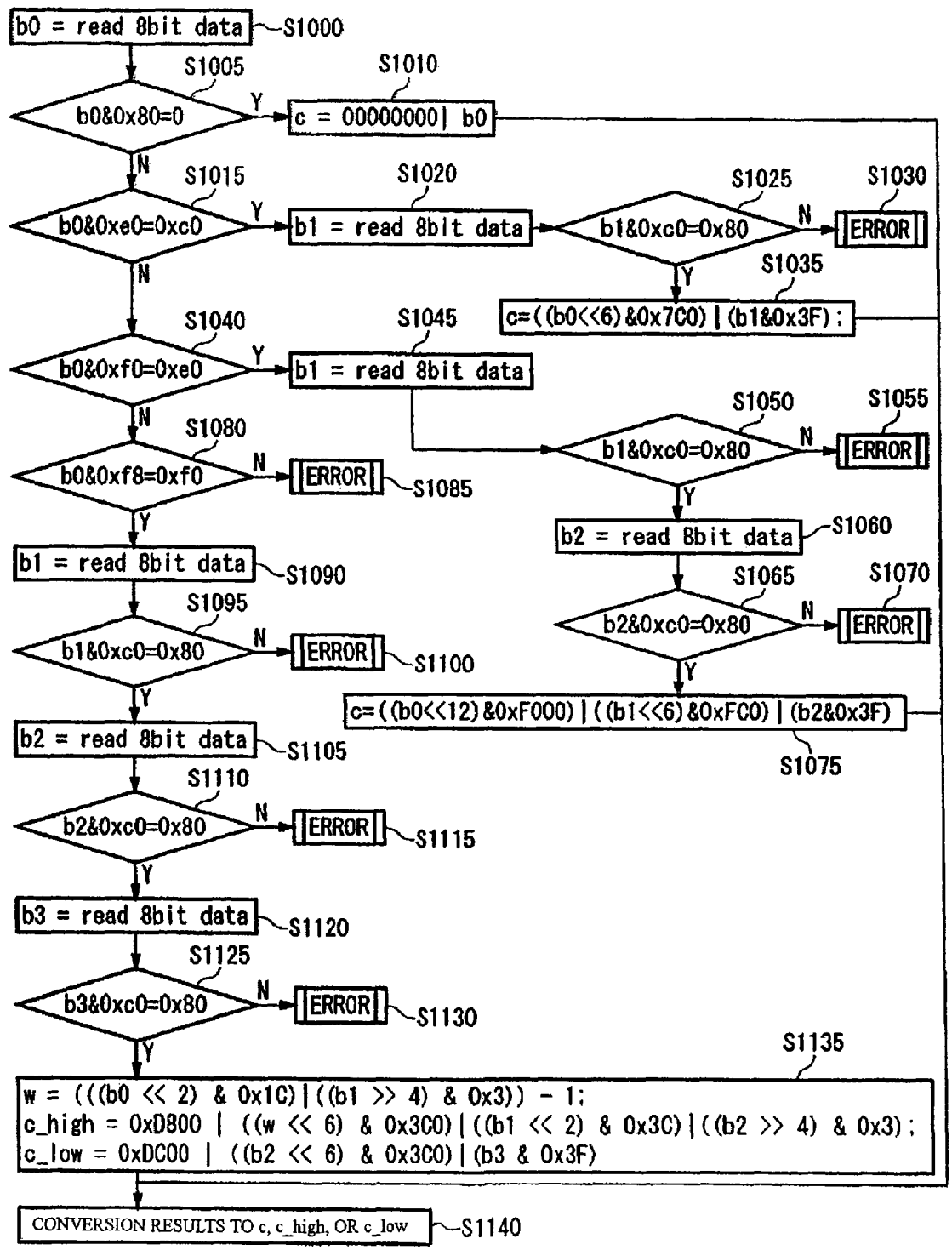

[Figure 11]
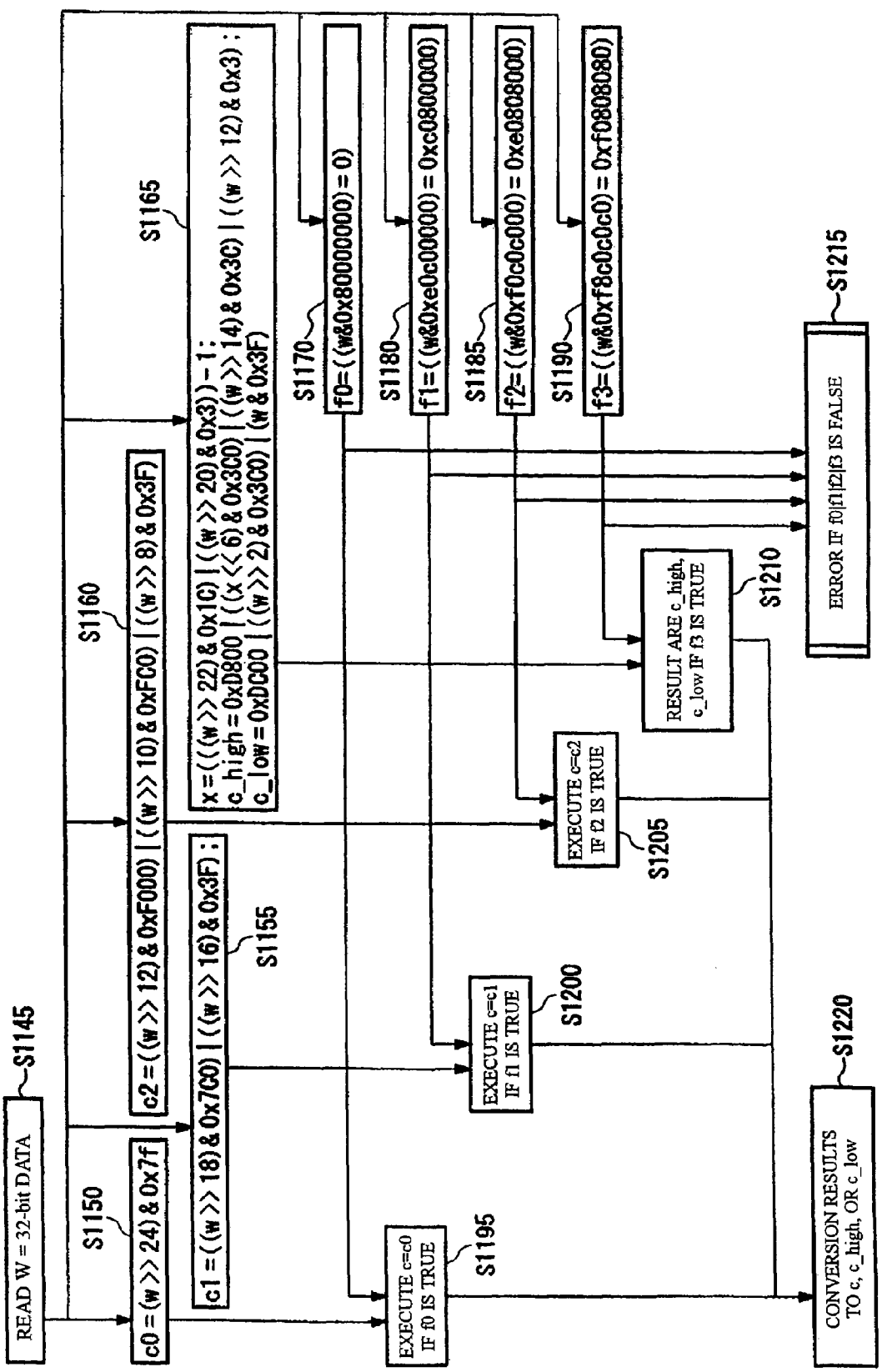

UTF81toUTF16 rs, rt, cr
  rt = (rs[1-7] >> 8) | (rs[9-15] >> 16) | (rs[17-23] >> 24) | (rs[25-31] >> 32)
  cr = (rs[0] == 0) && (rs[8] == 0) && (rs[16] == 0) && (rs[24] == 0)

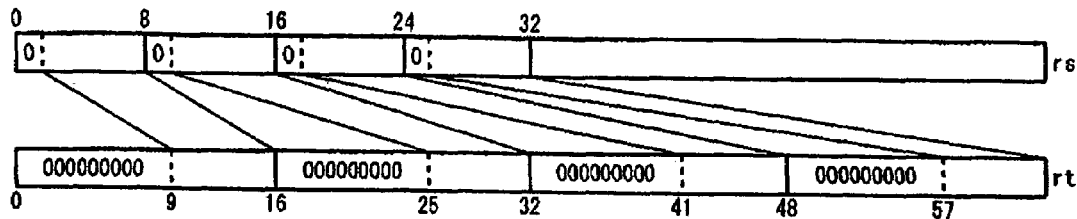

(b)

UTF82toUTF16 rs, rt, cr
  rt = (rs[3-7] >> 2 | rs[10-15]) | (rs[19-23] >> 2 | rs[26-31]) |
       (rs[35-39] >> 2 | rs[42-47]) | (rs[51-55] >> 2 | rs[58-63])
  cr = (rs[0-2] = 0b110) && (rs[8-9] = 0b10) &&
       ((rs[3] != 0b0) || ((rs[4-7] != 0x0000) && (rs[4-7] != 0x0001))) &&
       (rs[16-18] = 0b110) && (rs[24-25] = 0b10) &&
       ((rs[19] != 0b0) || ((rs[20-23] != 0x0000) && (rs[20-23] != 0x0001))) &&
       (rs[32-34] = 0b110) && (rs[40-41] = 0b10) &&
       ((rs[35] != 0b0) || ((rs[36-39] != 0x0000) && (rs[36-39] != 0x0001))) &&
       (rs[48-50] = 0b110) && (rs[56-57] = 0b10) &&
       ((rs[51] != 0b0) || ((rs[52-55] != 0x0000) && (rs[52-55] != 0x0001)))

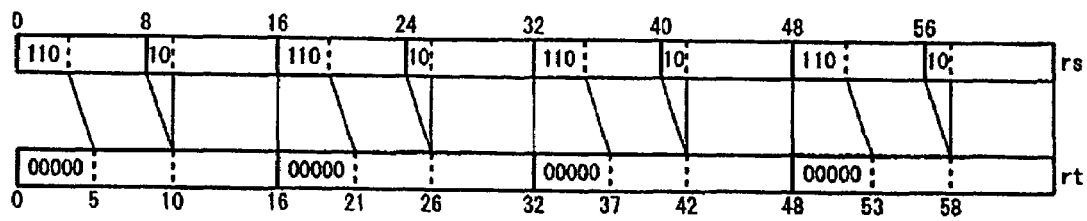

(c)

UTF83toUTF16 rs, rt, cr
  rt = (rs[4-7] >> 28) | rs[10-15] >> 26 | rs[18-23] >> 24 |
       (rs[28-31] >> 20 | rs[34-39] >> 18 | rs[42-47] >> 16)
  cr = (rs[0-3] = 0b1110) && (rs[8-9] = 0b10) && (rs[16-17] = 0b10) &&
       ((rs[4-7] != 0x1101) || (rs[10] != 0b1)) &&
       (rs[24-27] = 0b1110) && (rs[32-33] = 0b10) && (rs[40-41] = 0b10) &&
       ((rs[28-31] != 0x1101) || (rs[34] != 0b1))

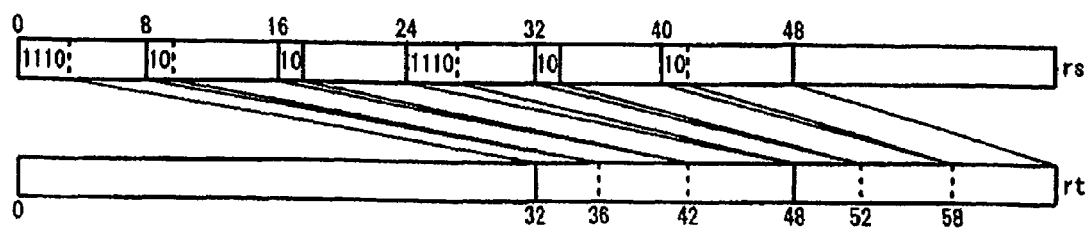

[Figure 13]
(a)
UTF16toUTF81 rs, rt, cr
  rt = (rs[9-15] >> 24) | (rs[25-31] >> 16) | (rs[41-47] >> 8) | (rs[57-63])
  cr = (rs[0-8] == 0b000000000) && (rs[16-24] == 0b000000000) &&
       (rs[32-40] == 0b000000000) && (rs[48-56] == 0b000000000)
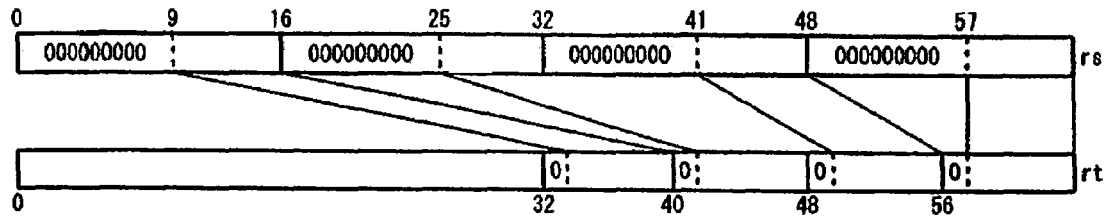
(b)
UTF16toUTF82 rs, rt, cr
  rt = (0xc080000000000000 | rs[5-9] << 2  | rs[10-15]) |
       (0x0000c08000000000 | rs[21-25] << 2 | rs[26-31]) |
       (0x00000000c0800000 | rs[37-41] << 2 | rs[42-47]) |
       (0x000000000000c080 | rs[53-57] << 2 | rs[58-63])
  cr = (rs[0-4] == 0b00000) && (rs[5-7] != 0b000) && (rs[16-20] == 0b00000) &&
       (rs[21-23] != 0b000) && (rs[32-36] == 0b00000) && (rs[37-39] != 0b000) &&
       (rs[48-52] == 0b00000) && (rs[53-55] != 0b000)
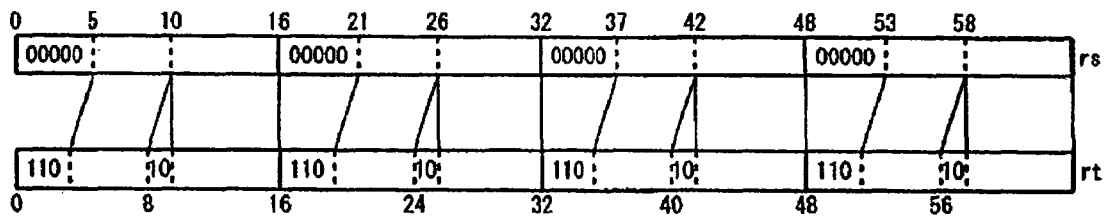
(c)
UTF16toUTF83 rs, rt, cr
  rt = (0xe080800000000000 | rs[32-35] << 28 | rs[36-41] << 26 | rs[42-47] << 24 |
       (0x000000e080800000 | rs[48-51] << 20 | rs[52-57] << 18 | rs[58-63] << 16)
  cr = ((rs[32-36] = 0b00001) | | (rs[32-35] != 0b0000)) &&
       ((rs[48-52] = 0b00001) | | (rs[48-51] != 0b0000))
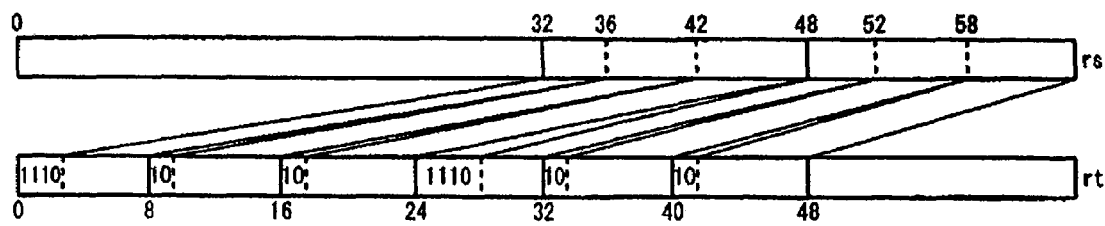
(d)
caddi rt, imm, rs, cr
  if (cr) rt = rs + imm

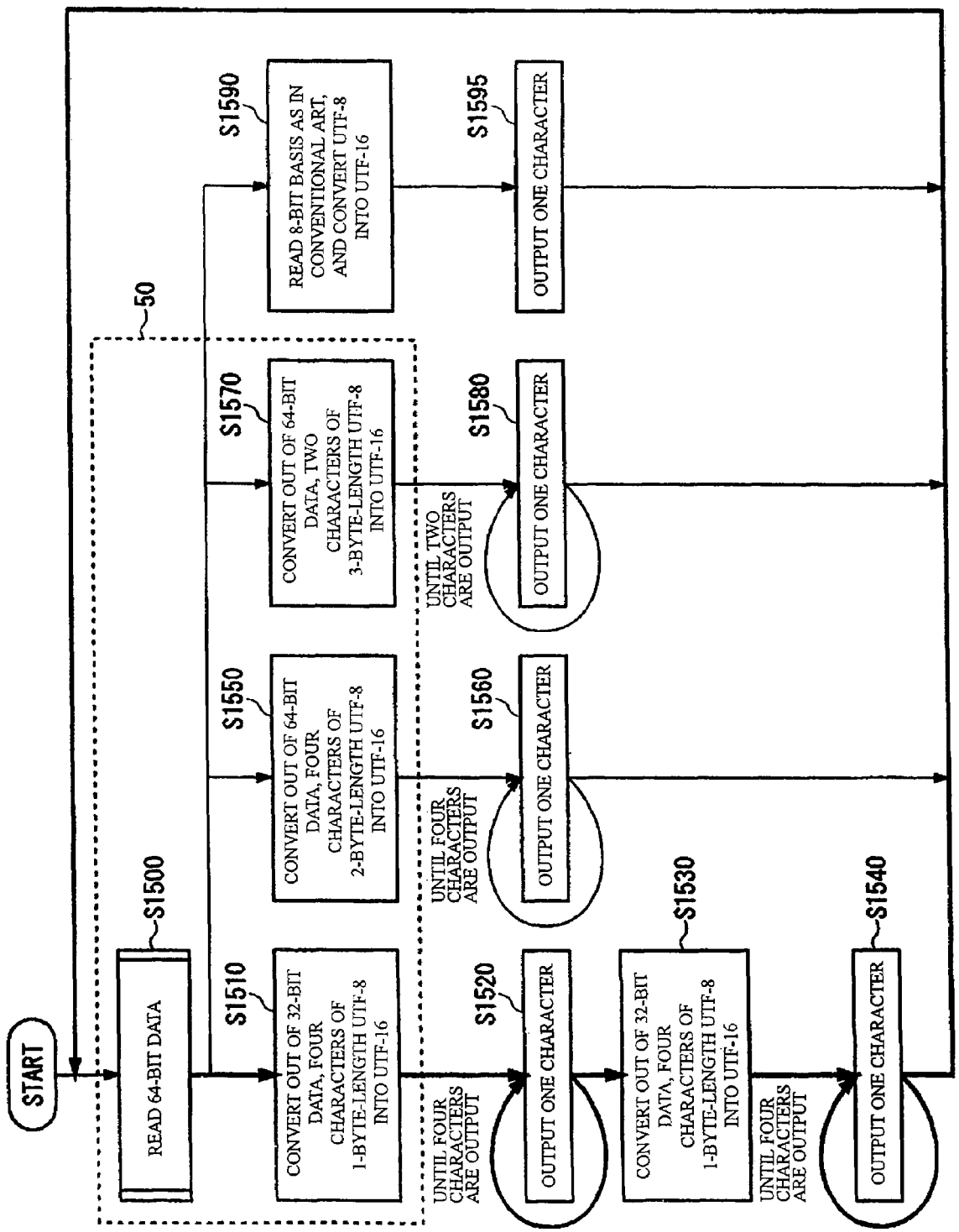
[Figure 14]

```
1:  // cycle 0
2:  ld          r6,r4(r3)                              // READ 64-BIT DATA FROM ADDRESS DESIGNATED BY r3
3:  // cycle 3
4:  UTF81toUTF16  r6,r7,0                              // src=r6, dst=r7, dst. cond=cr0.lt
5:  UTF82toUTF16  r6,r8,4                              // src=r6, dst=r8, dst. cond=cr1.lt
6:  // cycle 4
7:  UTF83toUTF16  r6,r9,8                              // src=r6, dst=r9, dst. cond=cr2.lt
8:  // cycle 5
9:  caddi       r4,0,r7,0                              // if (cr0.lt) r4 = r7 (RESULTS OF CONVERSION TO UTF16)
10: caddi       r5,4,r0,0                              // if (cr0.lt) r5 = 4 (NUMBER OF CONVERTED UTF-16 CHARACTERS)
11: cror        3,0,1                                  // cr3 = cr0 | cr1
12: // cycle 6
13: cror        3,3,2                                  // cr3 = cr3 | cr2
14: caddi       r3,4,r3,0                              // if (cr0.lt) r3 += 4 (ADVANCE BUFFER POINTER)
15: caddi       r4,0,r8,4                              // if (cr1.lt) r4 = r8 (RESULTS OF CONVERSION TO UTF16)
16: // cycle 7
17: caddi       r5,4,r0,4                              // if (cr1.lt) r5 = 4 (NUMBER OF CONVERTED UTF-16 CHARACTERS)
18: caddi       r3,8,r3,4                              // if (cr1.lt) r3 += 8 (ADVANCE BUFFER POINTER)
19: // cycle 8
20: caddi       r4,0,r9,8                              // if (cr2.lt) r4 = r9 (RESULTS OF CONVERSION TO UTF16)
21: caddi       r5,2,r9,8                              // if (cr2.lt) r5 = 2 (NUMBER OF CONVERTED UTF-16 CHARACTERS)
22: bcl         4,12,convert_UTF8_other_case           // IN CASE OF NON-CONFORMITY TO ANY OF CONVERSIONS
23:                                                    //   ACCORDING TO SPECIAL-PURPOSE INSTRUCTIONS
                                                       // (!cr3.lt), CONVERSION ACCORDING TO COMBINATION OF
                                                       //   CONVENTIONAL INSTRUCTIONS
24: // cycle 9
25: caddi       r3,6,r3,8                              // if (cr2.lt) r3 += 6 (ADVANCE BUFFER POINTER)
```

[Figure 16]
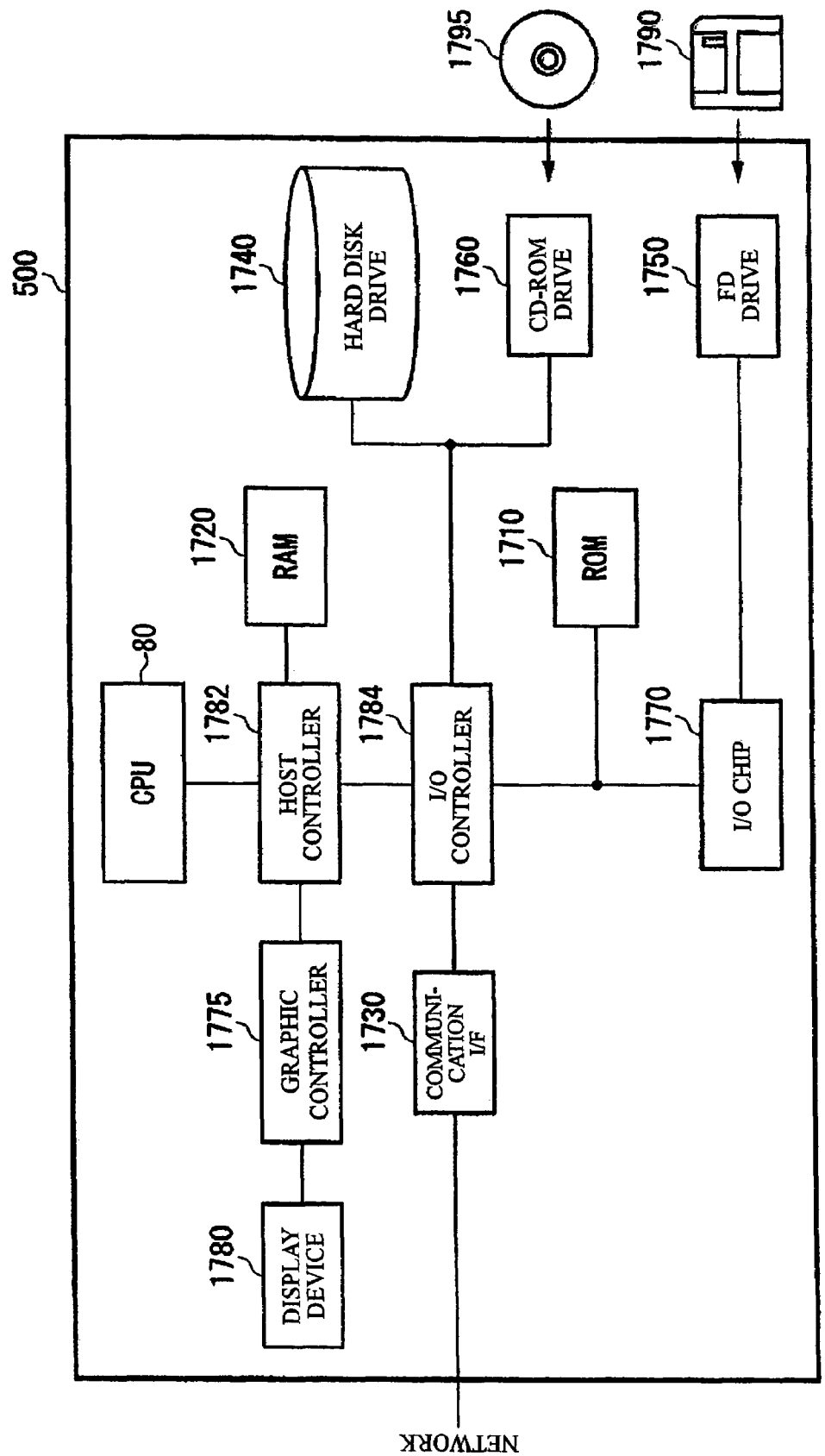

OPTIMIZATION OF CONVERSION OF A CHARACTER CODING SYSTEM

FIELD OF THE INVENTION

The present invention relates to a compiler, a compiler program, a recording medium, a control method and a central processing unit. More particularly, the present invention relates to a compiler which converts the character coding system of string variables to a compiler program, a recording medium, a control method and a central processing unit.

BACKGROUND ART

In recent years, XML (extensible Markup Language) has attracted attention as a technique for structuring various sorts of data and handling the structure data in a unifying manner. In XML, use of UTF8 (8-bit UCS Transformation Format) which is a character coding system for handling in a unifying manner characters used in various countries in the world is recommended. In UTF8, each of alphabetic characters expected to be used frequently can be expressed by one byte, while each of Japanese characters is expressed by about three bytes. Thus, the data size of characters in UTF8 varies depending on the kind of the character, etc.

In recent years, many APIs for efficiently analyzing and editing XML documents have been prepared in the Java (Registered Trademark) language. Java is a high level programming language developed by Sun Microsystems, originally designed for handheld devices and set-top boxes, modified to take advantage of the World Wide Web. Java is a general purpose object oriented language of the Web. In the Java (Registered Trademark) language, however, characters are ordinarily handled as data in UTF16 (16-bit UCS Transformation Format). Therefore, a procedure for converting from UTF8 to UTF16 is required for manipulating an XML document by a program written in the java (Registered Trademark) language. Further, a procedure for converting from UTF16 to UTF8 is required for enabling characters processed by a program written in the Java (Registered Trademark) language to be outputted as an XML document.

The following documents are considered:
- [Non-patent document 1] Internet URL "http://cvs.apache.org/viewcvs.cgi/xml-xerces/java/src/org/apache/xerces/impl/io/UTF8Reader.java?rev=1.7&content-type=text/vnd.viewcvs-markup"
- [Non-patent document 2] S. Makino, K. Tamura, T. Imamura, and Y. Nakamura. Implementation and Performance of WS-Security, IBM Research Report RT0546, 2003.
- [Non-patent document 3] J. Knoop, O. Ruthing, and B. Steffen. Optimal code motion: theory & practice. ACM TOPLAS, 18(3):300-324, 1996.
- [Non-patent document 4] R. Bodik, R. Gupta, and M. L Soffa. Complete removal of redundant expressions. In proceedings of the ACM SIGPLAN 1998 Conference on Programming Language Design and Implementation, pages 1-14, 1998.

Conventionally, a technique for converting a string of UTF8 characters successively arranged into a string of UTF16 characters is used (see non-patent document 1). In this technique, UTF8 characters are read out from a string one after another, the data length and the kind of the read character are determined, and one of different conversion procedures is performed according to the determination results. Also, a library program for manipulating UTF8 characters without converting them into UTF16 in the Java (Registered Trademark) language has been proposed (see non-patent document 2).

Description will be made below of non-patent documents 3 and 4.

The following is a disclosure of the invention and problems to be solved by the invention According to the technique described in non-patent document 2, procedures for converting UTF8 character s into UTF16 characters can be eliminated. However, many APIs for manipulating UTF16 characters have already been developed extensively, and it is not possible to efficiently develop programs by using the existing APIs. Also, in some cases, the efficiency of processing on UTF8 is lower than that of processing on UTF16. Therefore, the first challenge is to improve the efficiency of a procedure for converting from UTF8 to UTF16 while effectively utilizing the APIs already developed.

If the technique described in non-patent document 1 is used, a string of UTF8 characters can be suitably converted into a string of UTF16 characters. However, a procedure in which all characters to be manipulated are converted into UTF16 is not advantageous in terms of efficiency. For example, in a case where characters input in UTF8 are output in UTF8, procedure redundancy may occur such that conversion from UTF8 to UTF16 is made and conversion for returning to UTF8 is thereafter made. Therefore, the second challenge is to suitably select characters to be converted.

According to the example of the program in non-patent document 1, different procedures to be selected according to conditions including the UTF8 data size are required for converting UTF8 characters into UTF16 characters. Conditional branch instructions to make determinations with respect to conditions including the UTF8 data size are therefore generated. In central processing units, there is a possibility of an instruction pipeline being flushed by a conditional branch instruction to cause a reduction in processing efficiency. This is an undesirable phenomenon. Therefore, the third challenge is to minimize the occurrence of conditional branches in a conversion procedure.

SUMMARY OF THE INVENTION

Therefore, an aspect of the present invention is to provide a compiler, a compiler program, a recording medium, a control method and a central processing unit which make it possible to provide solutions to the above-described challenges. This aspect can be attained by a combination of features described in the independent claims in the appended claims. In the dependent claims, further advantageous examples of the present invention are specified. To achieve the above-described aspect, according to a first form of the present invention, there is provided a compiler which optimizes conversion of a character coding system for a character stored in a string variable in a target program to be optimized, the compiler having a conversion instruction generation section which generates a conversion instruction to convert a character from a first character coding system to a second character coding system and to store the converted character in a string variable before each of a plurality of procedures by which the character in the string variable written in the first character coding system is read out and is used in the second character coding system, and a conversion instruction removal section which removes each of conversion instructions generated by the conversion instruction generation section if a character in the second character coding system is stored in the string variable in each of the execution paths executed before the conversion instruction, a method of controlling the compiler, a program which enables a computer to function as the compiler, and a recording medium on which the program is recorded.

According to a second form of the present invention, there is provided a compiler which optimizes conversion of a character coding system for a character stored in a string variable in a target program to be optimized, the compiler having a character manipulating procedure generation section which executes each of a plurality of procedures by which a character in the string variable written in a first character coding system is read out and is used in a second character coding system, if the character stored in the string variable is a character in the second character coding system, and which generates a series of instructions with exceptions to allow occurrence of an exception, if the character stored in the string variable is a character in the first character coding system, and an exception handler generation section which generates an exception handler which is executed when an exception occurs, and which converts the character stored in the string variable from the first character coding system to the second character coding system, stores the converted character in the string variable, and returns to the procedure in which the exception has occurred, a method of controlling the compiler, a program which enables a computer to function as the compiler, and a recording medium on which the program is recorded.

According to a third form of the present invention, there is provided a compiler which optimizes a conversion procedure for converting from a first character coding system to a second character coding system a character stored in a string variable in a target program to be optimized, the compiler having an acquisition procedure generation section which generates a series of instructions to perform a procedure for obtaining a character code for a character to be converted, a conversion and detection procedure generation section which generates a series of instructions to execute in parallel each of a plurality of the conversion procedures one of which should be selected and executed according to the range of the value of the character code, and a detection procedure for detecting the range of the value of the character code, and a selection procedure generation section which selects the procedure results of one of the plurality of conversion procedures according to the detection result of the detection procedure, and outputs the selected procedure results, a method of controlling the compiler, a program which enables a computer to function as the compiler, and a recording medium on which the program is recorded. Thus, according to the present invention, conversion of a character coding system can be optimized.

BRIEF DESCRIPTION OF DRAWINGS

FIG. 1 depicts a block diagram if a compiler according to an exemplary embodiment of the present invention;

FIG. 2 depicts a string structure according to an exemplary embodiment of the present invention;

FIG. 3 illustrates a flow chart of a procedure according to an exemplary embodiment of the present invention;

FIG. 4 illustrates a program code representing a series of instructions according to an exemplary embodiment of the present invention;

FIG. 5 illustrates a program code applied to a SAX input library according to an exemplary embodiment of the present invention;

FIG. 6 illustrates a program code applied to a DOM input library according to an exemplary embodiment of the present invention;

FIG. 7 depicts a block diagram of a compiler and a central processing unit according to another exemplary embodiment of the present invention;

FIG. 8 illustrates a series of steps in a procedure in accordance with the exemplary embodiment depicted in FIG. 7;

FIG. 9 depicts UTF16 and UTF8 character coding systems in comparison to one another in accordance with the exemplary embodiment depicted in FIG. 7;

FIG. 10 illustrates a series of steps for converting UTF16 character codes into UTF8 in accordance with the exemplary embodiment depicted in FIG. 7;

FIG. 11 illustrates a flow of a conversion procedure in accordance with the exemplary embodiment depicted in FIG. 7;

FIG. 12 depicts a group of instructions provided in the central processing unit to convert UTF8 character codes into UTF16 character codes in accordance with the exemplary embodiment depicted in FIG. 7;

FIG. 13 depicts a group of instructions provided in the central processing unit to convert UTF8 character codes into UTF16 character codes in accordance with the exemplary embodiment depicted in FIG. 7;

FIG. 14 illustrates a generated series of instructions for optimization of conversion in accordance with the exemplary embodiment depicted in FIG. 7;

FIG. 15 illustrates a generated series of instructions for optimization of conversion in accordance with the exemplary embodiment depicted in FIG. 7; and FIG. 16 depicts a hardware configuration according to yet another exemplary embodiment of the present invention.

DETAILED DESCRIPTION OF THE INVENTION

The present invention provides a compiler, a compiler program, a recording medium, a control method and a central processing unit which make it possible to provide solutions to the above-described challenges. This aspect can be attained by a combination of features described in the independent claims in the appended claims. In the dependent claims, further advantageous examples of the present invention are specified. This is achieved according to a first form of the present invention. In this form, there is provided a compiler which optimizes conversion of a character coding system for a character stored in a string variable in a target program to be optimized, the compiler having a conversion instruction generation section which generates a conversion instruction to convert a character from a first character coding system to a second character coding system and to store the converted character in a string variable before each of a plurality of procedures by which the character in the string variable written in the first character coding system is read out and is used in the second character coding system, and a conversion instruction removal section which removes each of conversion instructions generated by the conversion instruction generation section if a character in the second character coding system is stored in the string variable in each of the execution paths executed before the conversion instruction, a method of controlling the compiler, a program which enables a computer to function as the compiler, and a recording medium on which the program is recorded.

According to a second form of the present invention, there is provided a compiler which optimizes conversion of a character coding system for a character stored in a string variable in a target program to be optimized, the compiler having a character manipulating procedure generation section which executes each of a plurality of procedures by which a character in the string variable written in a first character coding system is read out and is used in a second character coding system, if the character stored in the string variable is a character in the second character coding system, and which generates a series of instructions with exceptions to allow occurrence of an exception, if the character stored in the string variable is a character in the first character coding system, and an exception handler generation section which generates an exception handler which is executed when an exception occurs, and which converts the character stored in the string variable from the first character coding system to the second character coding system, stores the converted character in the string variable, and returns to the procedure in which the exception has occurred, a method of controlling the compiler, a program which enables a computer to function as the compiler, and a recording medium on which the program is recorded.

According to a third form of the present invention, there is provided a compiler which optimizes a conversion procedure for converting from a first character coding system to a second character coding system a character stored in a string variable in a target program to be optimized, the compiler having an acquisition procedure generation section which generates a series of instructions to perform a procedure for obtaining a character code for a character to be converted, a conversion and detection procedure generation section which generates a series of instructions to execute in parallel each of a plurality of the conversion procedures one of which should be selected and executed according to the range of the value of the character code, and a detection procedure for detecting the range of the value of the character code, and a selection procedure generation section which selects the procedure results of one of the plurality of conversion procedures according to the detection result of the detection procedure, and outputs the selected procedure results, a method of controlling the compiler, a program which enables a computer to function as the compiler, and a recording medium on which the program is recorded.

In is noted that not all the necessary features of the invention are listed. Subcombinations of the features can further constitute the present invention. An advantage of the present invention, is that conversion of a character coding system can be optimized.

The present invention will be described with respect to advantageous embodiments thereof. Each of the embodiments described below, however, is not limiting of the invention set forth in the appended claims, and all combinations of features described in the description of the embodiments are not necessarily indispensable to the solution according to the present invention.

EMBODIMENT 1

FIG. 1 is a block diagram of a compiler 10 (Embodiment 1). The compiler 10 is intended for optimization of conversion of a character coding system for a character stored in a string variable. The compiler 10 is intended particularly for optimization of a conversion instruction for conversion from UTF8, which is a character coding system for characters in XML documents, to UTF16, which is a character coding system used in a case where a string of characters is manipulated by a procedure written as a Java (Registered Trademark) program.

The compiler 10 has a character coding system determination section 100, a conversion instruction generation section 105, a conversion instruction removal section 110, a method information storage section 120, a method recursion determination section 130, a character manipulating procedure generation section 140, an exception handler generation section 145, and an output procedure instruction generation section 150. The character coding system determination section 100 receives, for example, with respect to each of methods to be optimized, a target program to be optimized, which is written in the Java (Registered Trademark) language. The character coding system determination section 100 then makes a determination as to whether or not the probability that a character input to the method is UTF16 is higher than a predetermined reference probability. If the probability that the input character is UTF16 is higher than the predetermined reference probability, the character coding system determination section 100 sends the method to the character manipulating procedure generation section 140. If the probability that the input character is UTF16 is lower than the predetermined reference probability, the character coding system determination section 100 sends the method to the conversion instruction generation section 105.

The conversion instruction generation section 105 generates a conversion instruction to convert a character from UTF8 to UTF16 and to store the converted character in a string variable before each of a plurality of procedures by which the character in the string variable written in UTF8 is read out and is used in UTF16. If, with respect to each of conversion instructions generated by the conversion instruction generation section 105, a UTF16 character is stored in the string variable in all execution paths executed before the conversion instruction, the conversion instruction removal section 110 removes the conversion instruction.

More specifically, if one of conditions described below is satisfied with respect to each execution path, the conversion instruction removal section 110 determines that a UTF16 character is stored in the string variable in the execution path.

1. A conversion instruction is executed in the execution path.

2. In the execution path, a constructor which secures a storage area for a UTF16 character in a string variable and which sets the character coding system to UTF16 is executed.

3. In the execution path, a method in which a UTF16 character is stored as a return value in a string variable is executed.

For example, the method information storage section 120 may store information for identification of a method having a UTF16 character as a return value, and the conversion instruction removal section 110 may determine whether or not a return value of a method corresponding to identification information stored in the method information storage section 120 in each execution path is stored in the string variable.

Further, if, with respect to each of the conversion instructions generated by the conversion instruction generation section 105, no UTF16 character is stored in the string variable in one of the execution paths executed before the conversion instruction, the conversion instruction removal section 110 generates a new conversion instruction in the execution path and removes the conversion instruction, thereby removing partial redundancy of the conversion instruction.

If a method to be optimized has a return value in UTF16, the method recursion determination section 130 stores the identification information on the method in the method information storage section 120. More specifically, if a method to be optimized further has as a return value one of a character stored in the string variable set in UTF16 by a constructor, a character already converted into UTF16 by a conversion instruction, and a return value of the method corresponding to identification information stored in the method information storage section 120, then the method recursion determination section 130 stores the identification information on the method in the method information storage section 120.

The character manipulating procedure generation section 140 executes each of a plurality of procedures by which a character in the string variable written in UTF8 is read out and is used in UTF16, if the character stored in the string variable is UTF16. If the character is UTF8, the character manipulating procedure generation section 140 generates a series of instructions with exceptions to allow occurrence of an exception. The exception handler generation section 145 generates an exception handler which is executed when an exception occurs, and which converts a character stored in the string variable from UTF8 to UTF16, stores the converted character in the string variable, and returns to the procedure in which the exception has occurred.

The output procedure instruction generation section 150 generates, as a procedure for outputting a character stored in the string variable, a series of instructions to output the character stored in the string variable if the character is UTF8, or return the character to UTF8 and output the character in UTF8 if the character stored in the string variable is UTF16. The output procedure instruction generation section 150 outputs the generated series of instructions as a resultant program, i.e., an optimized program, together with other methods optimized by the above-described procedure.

FIG. 2 shows an example of the data structure of a string variable 20 (Embodiment 1). The string variable 20 manages coding system information 210 indicating in which of UTF8 and UTF16 is a character stored in the string variable 20, a first character storage area 225 in which a UTF8 character is stored, and a second character storage area 235 in which a UTF16 character is stored. More specifically, the string variable 20 has coding system information 210, a first pointer 220 indicating the address of the first character storage area 225, a second pointer 230 indicating the address of the second character storage area 235, and data length information 240 indicating the length of character data stored in the first character storage area 225 or the second character storage area 235.

In a target program, a constructor which generates string variable 20 secures the first character storage area 225 and/or the second character storage area 235 as a memory area for storing a character, and sets a character coding system in the string variable. For example, the constructor generates coding system information 210 indicating that a character in the string variable is UTF8 or UTF16. From this information, the conversion instruction removal section 110 of the compiler 10 can determine in which of UTF8 and UTF16 the string variable constructor has set the string variable.

In a concrete method for realizing the string variable 20 shown in this figure, the definition of the standard String object in the Java (Registered Trademark) language is replaced with the definition of the String object relating to this figure in a JVM (Java (Registered Trademark) virtual machine), which is an environment in which a java (Registered Trademark) program is executed. Also, UTF8String is defined, which is a class in which UTF8 characters are manipulated. The class UTF8String includes, for example, the following methods:

Boolean is UTF8(String str), i.e., an API which reads out coding system information 210;

Byte [ ] getRawBytes(String str), i.e., an API which reads the first character storage area 225 or the second character storage area 235; and Int getRawLength(String str), i.e., an API which reads out data length information 240.

In the JVM, create, which is a method of generating the UTF8 String object is defined as follows.

String create(byte [ ]date, int start, int length)

In this method, a portion designated by second and third arguments in character data obtained by a first argument is extracted to be generated as an object having a UTF8 character.

FIG. 3 shows the flow of a procedure performed by the compiler 10 to optimize a conversion procedure (Embodiment 1). The character coding system determination section 100 determines whether or not the probability that a character input to each of methods is UTF8 is higher than a reference probability (S300). For example, the character coding system determination section 100 determines, with respect to a method specified in advance so that a UTF8 character is input, that the probability that a character input to the method is UTF16 is lower than the reference probability. More specifically, a group of methods described below are specified in advance so that an XML document is input and the character coding system determination section 100 determines that UTF8 is input to these methods.

The following methods in a SAX application program or methods (including a sub class) called up from the following methods.

org.xml.sax.Parser.parse(..)

org.xml.sax.XMLReader.parse(..)

javax.xml.parsers.SAXParser.parse(..)

The following methods in a DOM application program or methods (including a sub class) called up from the following methods.

Javax.xml.parsers.DocumentBuilder.parse(..)

Org.apache.xml.serialize.XMLserializer.serialize(...)

Javax.xml.parsers.DocumentBuilderFactory.newInstance(..)

The following methods in a Pull Parser application program or methods (including a sub class) called up from the following methods.

Org.xmlpull.vl.XmlPullParser.next( )

Org.xmlpull.vl.XmlPullParser.nextToken( )

Org.xmlpull.vl.XmlPullParser.nextTag( )

Org.xmlpull.vl.xmlPullParser.nextText( )

If the probability of being UTF16 is lower than the reference probability, the conversion instruction generation section 105 generates a conversion instruction to convert the character from UTF8 to UTF16 and to store the converted character in the string variable before each of a plurality of procedures by which the character in the string variable written in UTF8 is read out and is used in UTF16 (S310). The plurality of procedures is a group of methods in a predetermined class having, for example, a UTF16 character as an instance. For example, the plurality of procedures are all methods in the Java (Registered Trademark) language except those not requiring manipulation of character details in the UTF16 form, i.e., character output methods in the java/lang/String class and so on. That is, the conversion instruction generation section 105 generates a conversion instruction at such a position that the instruction is executed before each of procedures for calling up these methods, for example, immediately prior to the calling procedure.

If, with respect to each of conversion instructions generated by the conversion instruction generation section 105, a UTF16 character is stored in the string variable in all execution paths executed before the conversion instruction (this condition will be referred to as condition A), the conversion instruction removal section 110 removes the conversion instruction (S320). Further, if, with respect to each of the conversion instructions generated by the conversion instruction generation section 105, no UTF16 character is stored in the string variable in one of the execution paths executed before the conversion instruction (condition A is not satisfied), the conversion instruction removal section 110 generates a new conversion instruction in the execution path and removes the conversion instruction, thereby removing partial redundancy of the conversion instruction. This is done on condition that a UTF16 character is stored in the string variable at an execution position in the execution path and in each of the execution paths starting from the execution position (this condition will be referred to as condition B).

According to an example of a method for implementing this procedure, the conversion instruction removal section 110 may remove partial redundancy by one of methods described by way of example in non-patent documents 3 and 4. An example of a procedure for removing partial redundancy of the conversion instruction based on an application of the method described in non-patent document 3 will be described. First, the conversion instruction removal section 110 computes predicates shown below with respect to each of basic block in the method to be optimized. A procedure portion in a conversion instruction for checking whether or not a UTF8 character is stored in the string variable to be converted will be referred to as a format checking procedure.

TRANSP(bb): whether or not any content of the string variable to be processed by a format checking procedure in basic block bb is broken.

N-COMP(bb): whether or not a format checking procedure existing in basic block bb can be placed safely at the entrance to basic block bb (that is, whether or not the meaning of the objective program is changed).

X-COMP(bb): whether or not a format checking procedure existing in basic block bb can be placed safely at the exit from basic block bb (that is, whether or not the meaning of the objective program is changed).

Subsequently, the conversion instruction removal section 110 determines, by Busy Code Motion, portions where the format checking procedure first performed in the process of repeating format checking procedures two or more times on the same string variable is placed. More specifically, the conversion instruction removal section 110 first obtains up placement safety and down placement safety of the format checking procedure.

Up placement safety at the entrance to each basic block:
[Formula 1]

$$N\text{-}D\text{-}SAFE(bb) = N\text{-}COMP(bb) + TRANSP(bb) * X\text{-}D\text{-}SAFE(bb) \quad (1)$$

Up placement safety at the exit from each basic block:

[Formula 2] (2)

$$X - D - \text{SAFE}(bb) = X - COMP(bb) + \begin{cases} \text{false} & \text{if}(bb = \text{End point}) \\ \prod_{\text{Successor of } bb' = bb} N - D - \text{SAFE}(bb') & \text{otherwise} \end{cases}$$

Down placement safety at the entrance to each basic block:

[Formula 3] (3)

$$N - U - \text{SAFE}(bb) = X - COMP(bb) + \begin{cases} \text{false} & \text{if}(bb = \text{Starting point}) \\ \prod_{\text{Predecessor of } bb' = bb} \begin{pmatrix} X - COMP(bb') + \\ X - U - \text{SAFE}(bb') \end{pmatrix} & \text{otherwise} \end{cases}$$

Down placement safety at the exit from each basic block:
[Formula 4]

$$X\text{-}U\text{-}SAFE(bb) = TRANSP(bb) * (N\text{-}COMP(bb) + N\text{-}U\text{-}SAFE(bb)) \quad (4)$$

Subsequently, the conversion instruction removal section 110 obtains fixed point solutions of N-D-SAFE( ), X-D-SAFE( ), N-U-SAFE( ) and X-U-SAFE( ) by solving the above equations. The conversion instruction removal section 110 then determines the position at which a format checking procedure should be placed by using fixed-point solutions, as described below. At this time, since all format checking procedures originally placed are redundant according to the principle, the conversion instruction removal section 110 removes these format checking procedures.

A basic block in which a format checking procedure should be placed at the entrance=a basic block having the following equation (5) as true:

[Formula 5] (5)

$$N - D - \text{SAFE}(bb) \sum_{\text{Predecessor of } bb' = bb} \frac{a}{(X - U - \text{SAFE}(bb') + X - D - \text{SAFE}(bb'))}$$

A basic block in which a format checking procedure should be placed at the exit=a basic block having the following equation (6) as true:
[Formula 6]

$$X\text{-}D\text{-}SAFE(bb) * \overline{TRANSP(bb)} \quad (6)$$

Further, the conversion instruction removal section 110 may move, to a lower position, by Lazy Code Motion, a format checking procedure placed at an unnecessarily higher position, if the effect of reducing redundancy is not lost. This method corresponds to an application of the method described in non-patent document 3 as in the above-described case of Busy Code Motion and, therefore, no further description will be made of it.

Another example is possible in which the conversion instruction removal section 110 may modify the objective program so that the control flow is changed in order to further reduce conversion instructions. For example, the conversion instruction removal section 110 performs a procedure described below if, with respect to each of conversion instructions, no UTF16 character is stored in the string variable in part of execution paths to the conversion instruction (condition A is not satisfied), and if no UTF16 character is stored in the string variable at any execution position in the execution path and in each of the execution paths staring from the execution position (condition B is not satisfied).

The conversion instruction removal section 110 first obtains a confluence point between the execution paths in which UTF16 characters are stored and the execution path in which no UTF16 character is stored. The conversion instruction removal section 110 then obtains, in the path from the confluence point to the conversion instruction, a branching point between the execution paths in which UTF16 characters are stored and the execution path in which no UTF16 character is stored. Subsequently, the conversion instruction removal section 110 copies the path between the confluence point and the branching point, and connects each of the paths confluent at the confluence point to each of the copy original path and the copy destination path. The condition B is thereby satisfied. Thus, the conversion instruction removal section 110 can remove partial redundancy of the conversion instruction by the above-described method using busy code motion for example.

If the method to be optimized has UTF16 as a return value, the method recursion determination section 130 stores the identification information on the method in the method information storage section 120 (S330). More specifically, if the method to be optimized further has as a return value one of a character stored in the string variable set in UTF16 by a constructor, a character already converted into UTF16 by the conversion instruction, and a return value of the method corresponding to identification information stored in the method information storage section 120, then the method recursion determination section 130 stores the identification information on the method in the method information storage section 120.

On the other hand, in a case where the probability of being UTF16 is higher than the reference probability, the character manipulating procedure generation section 140 executes each of a plurality of procedures by which a character in the string variable written in UTF8 is read out and is used in UTF16, if the character stored in the string variable is UTF16. If the character is UTF8, the character manipulating procedure generation section 140 generates a series of instructions with exceptions to allow occurrence of an exception (S340).

More specifically, the character manipulating procedure generation section 140 generates, as a series of instructions with exceptions, a series of instructions to read the second character storage area 235 in which a UTF16 character is stored. In this case, the character manipulating procedure generation section 140 generates a series of instructions which is executed when a UTF8 character is stored in the string variable, and which generates an exception in the series of instructions with exceptions by setting the second pointer 230 indicating the address of the second character storage area 235 to an invalid address. The character manipulating procedure generation section 140 also generates a series of instructions which is executed when a UTF16 character is stored in the string variable, and which sets the second pointer 230 to a valid address. In the Java (Registered Trademark) language, methods of manipulating the string variable in the java/lang/String class may be rewritten in advance. The compiler 10 may compile the written methods to generate the above-described series of instructions.

The exception handler generation section 145 generates an exception handler which is executed when an exception occurs, and which converts a character stored in the string variable from UTF8 to UTF16, stores the converted character in the string variable, and returns to the procedure in which the exception has occurred (S350). If an exception handler already generated with respect to another method can be utilized, it is not necessary for the exception handler generation section 145 to again generate an exception handler in S350.

In a case where the object to be optimized is a method of performing an output procedure for outputting a character stored in the string variable, the output procedure instruction generation section 150 generates a series of instructions to output the character stored in the string variable if the character is UTF8, or return the character to UTF8 and output the character in UTF8 if the character stored in the string variable is UTF16 (S360).

FIG. 4 shows an example of a program representing the operation of a series of instructions generated as an output procedure by the output procedure instruction generation section 150 (Embodiment 1). This program is written by using the API described with reference to FIG. 2. More specifically, the output procedure is such that if the character coding system to be output is UTF8 and if the character that will be output is UTF8, the UTF8 character is output without being changed. On the other hand, if the character coding system to be output is UTF8 and if the character that will be output is UTF16, the character is output after being returned from UTF16 to UTF8.

A concrete example of the method of generating a series of instructions relating to this figure by means of the output procedure instruction generation section 150 comprises changing in advance the method of performing an output procedure (e.g., OutputStreamWriter.write) in a library program compiled together with the objective program by the compiler 10. Then, the output procedure instruction generation section 150 can generate a suitable series of instructions for realizing the output procedure relating to this figure by compiling the changed library program.

FIG. 5 shows an example of a program in which the compiler 10 in this embodiment is applied to a SAX input library (Embodiment 1). The interface of a SAX (The Simple API for XML) handler is shown in (a). An example of the SAX parser in this embodiment is shown in (b).

The SAX parser reads out to the respective elements of an input XML document startElement of an object in which a method defined by the ContentHandler interface is implemented. The SAX parser in this embodiment generates a String object having UTF8 character data if the character coding system of an input XML document is UTF8, and calls up the method startElement by using this generated object as an argument.

A piece of application program using the SAX parser in this embodiment is shown in (c). qName, which is an argument of StartElement, is delivered to OutputStreamWriter.writer( ) through Printwriter.print without being converted from UTF8. Consequently, the UTF8 characters are output in UTF8 without being converted to UTF16. Thus, a procedure for conversion between UTF16 and UTF8 can be optimized without making any change in the application program using the SAX parser.

FIG. 6 shows an example of a program in which the compiler 10 in this embodiment is applied to a DOM input library (Embodiment 1). In a DOM (Document Object Model), an application program obtains a character string such as an element name by calling up a method defined by a Node interface. The DOM input library in this embodiment generates, in the case of generation of a Document object, a UTF8 String object as a component of an object for implementation of a Node interface. This figure shows an example of implementation of a library for generating an object in such a class that an Element interface succeeding to a Node interface is implemented.

According to Embodiment 1 shown in FIGS. 1 through 6, a compiler program and a library program cooperate to reduce a procedure for converting the character coding system from UTF8 to UTF16 to the least necessary amount.

Consequently, an unnecessary conversion procedure can be eliminated, for example, in the case of directly outputting input UTF8. Also, from a method of manipulating characters in UTF16, a format checking procedure for checking whether or not an input character has already been converted into UTF16 can be eliminated.

Further, in a method in which the probability of input of a UTF16 character is higher, a conversion procedure may be generated not in an ordinary execution path but only in an exception handler, thereby further improving the efficiency. Further, the above-described procedure can be implemented by means of a library program and/or a compiler program without changing an application program. Thus, effective use of existing application programs is ensured.

EMBODIMENT 2

FIG. 7 is block diagram of a compiler 70 and a central processing unit 80 (Embodiment 2). The compiler 70 is intended for optimization of a conversion procedure for converting a character stored in a string variable from UTF8 to UTF16 in a target program to be optimized, or for optimization of a conversion procedure for conversion from UTF16 to UTF8. The compiler 70 has an acquisition procedure generation section 700, a conversion and detection procedure generation section 710 and a selection procedure generation section 720.

When a target program is input to the acquisition procedure generation section 700, the acquisition procedure generation section 700 first generates a series of instructions to perform a procedure for obtaining a character code for a character to be converted. A procedure by this series of instructions is hereinafter referred to as an acquisition procedure. The conversion and detection procedure generation section 710 then generates a series of instructions to execute in parallel each of a plurality of conversion procedures one of which should be selected and executed according to the range of the value of the character code, and a detection procedure for detecting the range of the value of the character code. A procedure by this series of instructions is hereinafter referred to as a conversion and detection procedure.

The selection procedure generation section 720 generates a series of instructions to perform a selection procedure for selecting and output the results of one of the plurality of conversion procedures on the basis of the detection result of the detection procedure. The central processing unit 80 executes the output series of instructions to generate a character code converted into UTF8 and output the converted character cods.

FIG. 8 shows the flow of a procedure performed by the compiler 10 to optimize a conversion procedure (Embodiment 2). The compiler 10 repeats a procedure described below for each of the conversion procedures for converting a UTF8 character into a UTF16 character. First, the acquisition procedure generation section 700 generates a series of instructions for an acquisition procedure (S800). For example, the acquisition procedure generation section 700 may generate a series of instructions to obtain unit data of a predetermined size including a character code. More specifically, if the character code is variable in length from 8 to 32 bits, 32-bit or 64-bit unit data including the character code may be obtained. Subsequently, the conversion and detection procedure generation section 710 generates a series of instructions for a conversion and detection procedure (S810). The selection procedure generation section 720 then generates a series of instructions for a selection procedure (S820).

FIG. 9 shows UTF16 and UTF8 character coding systems in comparison with each other (Embodiment 2). In UTF8, which is an example of the first character coding system in accordance with the present invention, a character code from 0 to 7F in hexadecimal notation is expressed as lower seven bits in a character code having a data size of one byte. On the other hand, in UTF16, which is an example of the second character coding system in accordance with the present invention, a character code from 0 to 7F in hexadecimal notation is expressed as lower seven bits in a character code having a data size of two bytes. Thus, the memory use efficiency of UTF8 is higher than that of UTF16 with respect to the character code from 0 to 7F in hexadecimal notation.

In UTF8, a character code from 80 to 7FF in hexadecimal notation is expressed by being divided into lower five bits in the first byte and lower six bits in the second byte in a character code having a data size of two bytes. The other bits are control data determined in advance to designate the data size, the kind of character or the like of the character code. On the other hand, in UTF16, this character code is expressed as lower eleven bits in a character code having a data size of two bytes.

In UTF8, a character code from 800 to 0FFF in hexadecimal notation is expressed by being divided into lower five bits in the second byte and lower six bits in the third byte in a character code having a data size of three bytes. The data in the first byte and other bits in the second and third bytes are control data determined in advance to designate the data size, the kind of character or the like of the character code. On the other hand, in UTF16, this character code is expressed as lower twelve bits in a character code having a data size of two bytes.

In UTF8, a character code from 1000 to DF77, or from E000 to FFFF in hexadecimal notation is expressed by being divided into lower four bits in the first byte, lower six bits in the second byte and lower six bits in the third byte in a character code having a data size of three bytes. On the other hand, in UTF16, this character code is expressed as lower sixteen bits in a character code having a data size of two bytes.

In UTF8, a character code from 10000 to 3FFFF in hexadecimal notation is expressed by being divided into lower six bits in the second byte, lower six bits in the third byte and lower six bits in the fourth byte in a character code having a data size of four bytes.

The data in the first byte and other bits in the second to fourth bytes are control data determined in advance to designate the data size, the kind of character or the like of the character code. On the other hand, in UTF16, this character code is expressed as lower eighteen bits in a twenty-bit character code.

In UTF8, a character code from 40000 to FFFFF in hexadecimal notation is expressed by being divided into lower two bits in the first byte, lower four bits in the second byte, lower six bits in the third byte and lower six bits in the fourth byte in a character code having a data size of four bytes. The other bits are control data determined in advance to designate the data size, the kind of character or the like of the character code. On the other hand, in UTF16, this character code is expressed as lower twenty bits in a twenty-bit character code.

In UTF8, a character code from 100000 to 10FFFF in hexadecimal notation is expressed by being divided into lower four bits in the second byte, lower six bits in the third byte and lower six bits in the fourth byte in a character code having a data size of four bytes. The data in the first byte and other bits are control data determined in advance to designate the data size, the kind of character or the like of the character code. On the other hand, in UTF16, this character code is expressed as lower sixteen bits in a twenty-four-bit character code.

Thus, in UTF8, the data size of a character code varies depending on the value of the character code stored or the kind of character. On the other hand, in UTF16, the data size is two bytes and constant except for characters exceeding 10000 in hexadecimal notation. Consequently, UTF8 has higher memory use efficiency in a case where characters of a small data size are successively placed. On the other hand, the data size in UTF16 does not change frequently with respect to kinds of characters in comparison with that in UTF8. Therefore, the speed of processing on UTF16 is ordinarily higher than that of processing on UTF8.

In order to convert UTF8 into UTF16, it is necessary to read out control data in UTF8 character codes and select a suitable conversion procedure according to the control data. An example of this procedure for converting UTF16 into UTF8 will be described below with reference to FIG. 10. Constants used in computation are shown in hexadecimal notation unless otherwise specified in the following description with reference to this figure.

The central processing unit of a computer cooperates with a memory and other piece of hardware to read first eight bits in a character code to a variable b0 (S1000). In the following description, "the central processing unit of the computer in cooperation with a memory and other pieces of hardware" is referred to simply as "the computer". If the result of masking with 80 of the character code read out is 0 (S1005: YES), the logical add of the variable b0 and a binary number 00000000, i.e., the variable b0 itself, is computed (S1010), and the process moves to S1140.

In a case where the result of masking of variable b0 with 80 is a value other than 0 (S1005: NO), the computer reads to a variable b1 the next eight bits subsequent to the character code read out as variable b0 (S1020) if the result of masking of the variable b0 with e0 is c0 (S1015: YES). If the result of masking of the variable b1 with c0 is not 80 (S1025: NO), the computer notifies a user or the like that an error has occurred in a conversion procedure (S1030). For example, this event corresponds to a case where the input character does not conform to UTF8.

On the other hand, if the result of masking of the variable b1 with c0 is 80 (S1025: YES), the computer stores in a variable c the logical add of a value obtained by shifting the variable b0 six bits to the left and by masking the shifted value with 7c0 and a value obtained by masking the variable b1 with 3f (S1035) to enable output of this value in S1140. If the result of masking of the variable b0 with e0 is not c0 (S1015: NO), the computer determines whether or not the result of masking of the variable b0 with f0 is e0 (S1040). If the result is e0 (S1040: YES), the computer reads to the variable b1 the next eight bits subsequent to the character code read out as b0 (S1045).

If the result of masking of the variable b1 with c0 is not 80 (S1050: NO), the computer notifies the user or the like that an error has occurred in a conversion procedure (S1055). On the other hand, if the result of masking of the variable b1 with c0 is 80 (S1050: YES), the computer reads to a variable b2 the next eight bits subsequent to the character code read out as b1 (S1060).

If the result of masking of the variable b2 with c0 is not 80 (S1065: NO), the computer notifies the user or the like that an error has occurred in a conversion procedure (S1070). If the result of masking of the variable b2 with c0 is 80 (S1065: YES), the computer stores in the variable c the logical add of a value obtained by shifting the variable b0 twelve bits to the left and by masking the shifted value with f000, a value obtained by shifting the variable b1 six bits to the left and by masking the shifted value with fc0, and a value obtained by masking the variable b2 with 3f (S1075).

If the result of masking of the variable b0 with f0 is not e0 (S1040: NO), the computer determines whether or not the result of masking of the variable b0 with f8 is f0 (S1080). If the result is not f0 (S1080: NO), the computer notifies the user or the like that an error has occurred in a conversion procedure (S1085). If the result of masking of the variable b0 with f8 is f0 (S1080: YES), the computer reads to the variable b1 the next eight bits subsequent to the character code read out as b0 (S1090).

If the result of masking of the variable b1 with c0 is not 80 (S1095: NO), the computer notifies the user or the like that an error has occurred in a conversion procedure (S1100). On the other hand, if the result of masking of the variable b1 with c0 is 80 (S1095: YES), the computer reads to the variable b2 the next eight bits subsequent to the character code read out as b1 (S1105).

If the result of masking of the variable b2 with c0 is not 80 (S1110: NO), the computer notifies the user or the like that an error has occurred in a conversion procedure (S1115). If the result of masking of the variable b2 with c0 is 80 (S1110: YES), the computer reads to a variable b3 the next eight bits subsequent to the character code read out as b2 (S1120).

If the result of masking of the variable b3 with c0 is not 80 (S1125: NO), the computer notifies the user or the like that an error has occurred in a conversion procedure (S1130). If the result of masking of the variable b3 with c0 is 80 (S1125: YES), the computer performs the following computation (S1135). First, the computer obtains the logical add of a value obtained by shifting the variable b0 two bits to the left and by masking the shifted value with 1c and a value obtained by shifting the variable b1 four bits to the right and by masking the shifted value with 3, subtracts 1 from the obtained logical add, and stores in a variable w the value obtained by this subtraction.

The computer then stores in a variable c_high the logical add of a constant d800, a value obtained by shifting the variable w six bits to the left and by masking the shifted value with 3c0, a value obtained by shifting the variable b1 two bits to the left and by masking the shifted value with 3c, and a value obtained by shifting the variable b2 four bits to the right and masking the shifted value with 3. Further, the computer stores in a variable c_low the logical add of a constant dc00, a value obtained by shifting the variable b2 six bits to the left and by masking the shifted value with 3c0 and a value obtained by masking the variable b3 with 3f.

Finally, the computer outputs as a UTF16 character code the value stored in the variable c or the value having c_high as upper bits and c_low as lower bits (S1140).

Thus, it is necessary to read out control data in UTF8 character codes and select a suitable conversion procedure according to the control data in order to convert UTF8 into UTF16. That is, the computer is required, for example, to perform conditional branching by determining the values of the control data. In a case where conditional branching is frequently performed as shown in this figure, a group of instructions to be next executed cannot be correctly predicted and it is, therefore, difficult for the computer to previously read and promptly execute an instruction to be performed after a presently executed instruction. For this reason, the parallelism of instructions executable by the central processing unit of the computer cannot be effectively utilized. The efficiency of execution of the objective program is thereby reduced. Further, while recent central processing units are capable of storing 64-bit data in a register, only 8-bit data can be stored in a register in ordinary cases of a procedure corresponding to the procedure in this example, which is disadvantageous in terms of efficiency.

In contrast, the compiler 10 in this embodiment is capable of improving the efficiency of execution of conversion instructions by reducing the number of conditional branches. An example of conversion instructions generated by the compiler 10 in this embodiment will be described below.

FIG. 11 is a diagram showing the flow of a conversion procedure generated by a compiler 70 in this embodiment (Embodiment 2). Also in this figure, constants in computation are shown in hexadecimal notation unless otherwise specified. First, the computer performs an acquisition procedure to read out 32-bit data and stores the data in a variable w (S1145). The computer then performs, as conversion and detection procedures, eight procedures shown in S1150 to S1190 in parallel with each other.

More specifically, the computer performs the first conversion procedure to store in a variable c0 a value obtained by shirting the variable w twenty-four bits to the right and by masking with 7f (S1150). The computer also performs the second conversion procedure to store in a variable c1 the logical add of a value obtained by shifting the variable w eighteen bits to the right and by masking with 7c0 and a value obtained by shifting the variable w sixteen bits to the right and by masking with 3f (S1155). The computer also performs the third conversion procedure to store in a variable c2 the logical add of a value obtained by shifting the variable w twelve bits to the right and by masking with f000, a value obtained by shifting the variable w ten bits to the right and by masking with fc0 and a value obtained by shifting the variable w eight bits to the right and by masking with 3f (S1160).

Further, the computer performs the fourth conversion procedure to obtain the logical add of a value obtained by shifting the variable w twenty-two bits to the right and by masking with 1c and a value obtained by shifting the variable w twenty bits to the right and by masking with 3, subtract 1 from the logical add, and store in a variable x the result of this subtraction (S1165). The computer performs the next procedure as the fourth conversion procedure to store in a variable c_high the logical add of a constant d800, a value obtained by shifting the variable x six bits to the left and by masking with 3c0, a value obtained by shifting the variable w fourteen bits to the right and by masking with 3c and a value obtained by shifting the variable w twelve bits to the right and by masking with 3. The computer then stores in a variable c_low the logical add of a constant dc00, a value obtained by shifting the variable w two bits to the right and by masking with 3c0 and a value obtained by masking the variable w with 3f.

The computer also performs a detection procedure to store "true" in a variable f0 if a value obtained by masking the variable w with 80000000 is 0 (S1170). The computer also stores "true" in a variable f1 if a value obtained by masking the variable w with e0c00000 is c0800000 (S1180). The computer also stores "true" in a variable f2 if a value obtained by masking the variable w with f0c0c000 is c0808000 (S1185). The computer also stores "true" in a variable f3 if a value obtained by masking the variable w with f8c0c0c0 is f0808080 (S1190).

The computer may execute the above-described first to fourth conversion procedures and a detection procedure in parallel with each other or may execute at least two of these procedures in parallel with each other. Subsequently, the computer executes procedures from S1195 to S1220 as selection procedures.

More specifically, the computer first stores the variable c0 in the variable c if the variable f0 is true (S1195). The computer stores the variable c1 in the variable c if the variable f1 is true (S1200). The computer stores the variable c2 in the variable c if the variable f2 is true (S1205). In these cases, the computer outputs the content of the variable c as a conversion result (S1220). If the variable f3 is true, the computer outputs as a UTF16 character code a value having c_high as upper bits and c_low as lower bits (S1220). If none of f0 to f3 is true, the computer notifies that an error has occurred in a conversion procedure (S1215).

Thus, according to the series of instructions generated by the compiler 70 in this embodiment, a plurality of conversion procedures each of which should be selected and executed can be speculatively executed before condition determination. Also, a conversion procedure and a detection procedure can be executed in parallel with each other without processing conditional branching. Thus, the performance of the central processing unit capable of executing a plurality of instructions in parallel with each other can be effectively utilized to efficiently convert the character coding system.

Procedures for converting at a time a plurality of character codes successively arrayed and equal in data size will be described as a method of performing this conversion procedure more efficiently. From the viewpoint of more efficiently executing this procedure, it is preferred that a central processing unit 80 should have a group of instructions suitable for a conversion procedure. A group of instructions provided in the central processing unit 80 will be described with reference to FIGS. 12 and 13. An example of a process in which the compiler 70 generates a series of instructions including these instructions will be described with reference to FIG. 14.

FIG. 12 shows an example of a group of instructions provided in the central processing unit 80 to convert UTF8 into UTF16 (Embodiment 2). Details of an instruction UTF81 to UTF16 are shown in (a). The conversion and detection procedure generation section 710 generates, as instruction UTF81 to UTF16, in a 64-bit register rs, instructions to execute a detection procedure for detection as to whether or not a plurality of character codes having a data size of eight bits are successively arrayed, in parallel with a conversion procedure to be executed in a case where a plurality of character codes having a data size of eight bits are successively arrayed.

More specifically, according to the instruction UTF81 to UTF16, the central processing unit 80 copies the 1st to 7th bits, the 9th to 15th bits, the 17th to 23rd bits, and the 25th to 31st bits in the register rs to the 9th to 15th bits, the 25th to 31st bits, the 41st to 47th bits, and the 57th to 63rd bits in a register rt, respectively.

Further, according to the instruction UTF81 to UTF16, the central processing unit 80 stores 1 in a register cr to indicate a detection result that a plurality of character codes having a data size of eight bits are successively arrayed if each of the 0th bit, the 8th bit, the 16th bit and the 24th bit in the register rs is 0.

Details of an instruction UTF82 to UTF16 are shown in (b). The conversion and detection procedure generation section 710 generates, as instruction UTF82 to UTF16, in the 64-bit register rs, instructions to execute a detection procedure for detection as to whether or not a plurality of character codes having a data size of sixteen bits are successively arrayed, in parallel with a conversion procedure to be executed in a case where a plurality of character codes having a data size of sixteen bits are successively arrayed.

More specifically, according to the instruction UTF82 to UTF16, the central processing unit 80 combines the 3rd to 7th bits and the 10th to 15th bits in the register rs and copies these bits to the 5th to 15th bits in the register rt. Also, the central processing unit 80 combines the 19th to 23rd bits and the 26th to 31st bits in the register rs and copies these bits to the 21st to 31st bits in the register rt.

Also, the central processing unit 80 combines the 35th to 39th bits and the 42nd to 47th bits in the register rs and copies these bits to the 37th to 47th bits in the register rt. Also, the central processing unit 80 combines the 51st to 55th bits and the 58th to 63rd bits in the register rs and copies these bits to the 53rd to 63rd bits in the register rt.

Further, according to the instruction UTF82 to UTF16, the central processing unit 80 determines whether or not each of the sets of the 0th to 2nd bits, the 16th to 18th bits, the 32nd to 34th bits and the 48th to 50th bits in the register rs satisfy a condition: a binary number 110. The central processing unit 80 determines whether or not each of the pairs of the 8th and 9th bits, the 24th and 25th bits, the 40th and 41st bits and 56th and 57th bits satisfy a condition: a binary number 10.

Further, the central processing unit 80 determines whether or not the condition that the 3rd bit in the register rs is not 0 or the 4th to 7th bits are neither 000 nor 001 is satisfied. The central processing unit 80 determines whether or not the condition that the 19th bit in the register rs is not 0 or the 20th to 23rd bits are neither 000 nor 001 is satisfied. The central processing unit 80 determines whether or not the condition that the 35th bit in the register rs is not 0 or the 36th to 39th bits are neither 000 nor 001 is satisfied. The central processing unit 80 determines whether or not the condition that the 51st bit in the register rs is not 0 or the 52nd to 55th bits are neither 000 nor 001 is satisfied. If all the above conditions are satisfied, the central processing unit 80 stores 1 in the register cr.

Details of an instruction UTF83 to UTF16 are shown in (c). The conversion and detection procedure generation section 710 generates, as instruction UTF83 to UTF16, in the 64-bit register rs, instructions to execute a detection procedure for detection as to whether or not a plurality of character codes having a data size of twenty-four bits are successively arrayed, in parallel with a conversion procedure to be executed in a case where a plurality of character codes having a data size of twenty-four bits are successively arrayed.

More specifically, according to the instruction UTF83 to UTF16, the central processing unit 80 combines the 4th to 7th bits, the 10th to 15th bits and the 18th to 23rd bits in the register rs and copies these bits to the 32nd to 47th bits in the register rt. Also, the central processing unit 80 combines the 28th to 31st bits, the 34th to 39th bits and the 42nd to 47th bits in the register rs and copies these bits to the 48th to 63rd bits in the register rt.

Further, according to the instruction UTF83 to UTF16, the central processing unit 80 determines whether or not each of the sets of the 0th to 3rd bits and the 24th to 27th bits in the register rs satisfy a condition: a binary number 1110. Further, according to the instruction UTF83 to UTF16, the central processing unit 80 determines whether or not each of the pairs of the 8th and 9th bits, the 16th and 17th bits, the 32nd and 33rd bits and 40th and 41st bits in the register rs satisfy a condition: a binary number 10.

Further, the central processing unit 80 determines whether or not the condition that the 4th to 7th bits in the register rs are not a binary number 1101 or the 10th bit is not 1 is satisfied. The central processing unit 80 determines whether or not the condition that the 28th to 31st in the register rs are not a binary number 1101 or the 34th bit is not 1 is satisfied. If all the above conditions are satisfied, the central processing unit 80 stores 1 in the register cr.

As shown in this figure, the conversion and detection procedure generation section 710 can generate, with respect to each of character code data sizes of eight bits, sixteen bits, and twenty-four bits, instructions to execute a detection procedure for detection as to whether or not a plurality of character codes of the corresponding data size are successively arrayed in unit data, in parallel with a conversion procedure to be executed in a case where a plurality of character codes of the corresponding data size are successively arrayed in the unit data.

If a procedure according to these instructions is implemented by using logical circuits, NAND gates in two or three stages are required. While a signal delay in a case where NAND gates are implemented is taken into consideration, these instructions can be executed with latency of one cycle and at a throughput of one cycle, as in the case of simple addition instructions. That is, according to the instructions in this figure, the computer can convert a UTF8 character string of about four characters per cycle at the maximum into a UTF16 character sequence.

FIG. 13 shows other instructions provided in the central processing unit 80. Details of an instruction UTF16 to UTF81 which is one of a group of instructions to convert UTF16 into UTF8 are shown in (a) (Embodiment 2). The conversion and detection procedure generation section 710 generates, as instruction UTF16 to UTF81, in the 64-bit register rs, instructions to execute a detection procedure for detection as to whether or not character codes which have a data size of eight bits and which are to be converted into UTF8 are successively arrayed, in parallel with a conversion procedure to be executed in a case where character codes which have a data size of eight bits and which are to be converted into UTF8 are successively arrayed.

More specifically, according to the instruction UTF16 to UTF81, the central processing unit 80 copies the 9th to 15th bits, the 25th to 31st bits, the 41st to 47th bits, and the 57th to 63rd bits in the register rt to the 33rd to 39th bits, the 41st to 47th bits, the 49th to 55th bits, and the 57th to 63rd bits in the register rt, respectively.

Further, according to the instruction UTF16 to UTF81, the central processing unit 80 stores 1 in the register cr if the condition that all of the 0th to 8th bits, the 16th to 24th bits, the 32nd to 40th bits, the 48th to 56th bits in the register rs is 0 is satisfied.

Details of an instruction UTF16 to UTF82 which is provided in the central processing unit 80 and one of the groups of instructions to convert UTF16 into UTF8 are shown in (b). The conversion and detection procedure generation section 710 generates, as instruction UTF16 to UTF82, in the 64-bit register rs, instructions to execute a detection procedure for detection as to whether or not 16-bit UTF16 character codes to be converted into UTF8 are successively arrayed, in parallel with a conversion procedure to be executed in a case where 16-bit UTF16 character codes to be converted into UTF8 are successively arrayed.

More specifically, according to the instruction UTF16 to UTF82, the central processing unit 80 copies the 5th to 15th bits in the register rs to the 3rd to 7th bits and the 10th to 15th bits in the register rt by dividing the 5th to 15th bits in the register rs. The central processing unit 80 also copies the 21st to 31st bits in the register rs to the 19th to 23rd and the 26th to 31st bits in the register rt by dividing the 21st to 31st bits in the register rs.

Further, according to the instruction UTF16 to UTF82, the central processing unit 80 copies the 37th to 47th bits in the register rs to the 35th to 39th bits and the 42nd to 47th bits in the register rt by dividing the 37th to 47th bits in the register rs. The central processing unit 80 also copies the 53rd to 63rd bits in the register rs to the 51st to 55th bits and the 58th to 63rd bits in the register rt by dividing the 53rd to 63rd bits in the register rs.

Further, according to the instruction UTF16 to UTF82, the central processing unit 80 determines whether or not the 0th to 4th bits, the 16th to 20th bits, the 32nd to 36th bits, and the 48th to 52nd bits in the register rs satisfy the condition that each bit is 0. The central processing unit 80 determines whether or not each of the sets of the 5th to 7th bits, the 21st to 23rd bits, the 37th to 39th bits, and the 53rd to 55th bits satisfy the condition that they are not a binary number 000. If all the above conditions are satisfied, the central processing unit 80 stores 1 in the register cr.

Details of an instruction UTF16 to UTF82 which is one of the groups of instructions to convert UTF16 into UTF8 are shown in (c). The conversion and detection procedure generation section 710 generates, as instruction UTF16 to UTF83, in the 64-bit register rs, instructions to execute a detection procedure for detection as to whether or not 24-bit UTF16 character codes to be converted into UTF8 are successively arrayed, in parallel with a conversion procedure to be executed in a case where 24-bit UTF16 character codes to be converted into UTF8 are successively arrayed.

More specifically, according to the instruction UTF16 to UTF83, the central processing unit 80 copies the 32nd to 47th bits in the register rs to the 4th to 7th bits, the 10th to 15th bits, and the 18th to 23rd bits in the register rt by dividing the 32nd to 47th bits in the register rs. The central processing unit 80 also copies the 48th to 63rd bits in the register rs to the 28th to 31st bits, the 34th to 39th bits, and the 42nd to 47th bits in the register rt by dividing the 48th to 63rd bits in the register rs.

Further, according to the instruction UTF16 to UTF83, the central processing unit 80 determines whether or not the condition that the 32nd to 36th bits in the register rs are a binary number 00001 or the 32nd to 35th bits are not a binary number 0000 is satisfied. The central processing unit 80 also determines whether or not the condition that the 48th to 52nd bits in the register rs are a binary number 00001 or the 48th to 51st bits are not a binary number 0000 is satisfied. If all the above conditions are satisfied, the central processing unit 80 stores 1 in the register cr.

An example of a conditional addition instruction provided in the central processing unit 80 is shown in (d). By this instruction, the computer stores in the register rt the result of addition of a constant imm to the register rs when the register cr is 1.

FIG. 14 shows the flow of a procedure of a series of instructions generated by the compiler 10 in such a manner that a conversion procedure is optimized (Embodiment 2). According to a series of acquisition procedure instructions generated by the acquisition procedure generation section 700, the computer reads unit data of a predetermined size, e.g., 64-bit data to a register (S1500). This read destination register is a resister r6. Subsequently, the computer performs in parallel the following procedure as a conversion and detection procedure generated by the acquisition procedure generation section 700.

The computer first executes a detection procedure for detection as to whether or not one-byte UTF8 is successively arrayed in the register r6 in parallel with a conversion procedure to be executed in a case where one-byte UTF8 is successively arrayed in the register r6 (S1510). The computer also executes a detection procedure for detection as to whether or not two-byte UTF8 is successively arrayed in the register r6 in parallel with a conversion procedure to be executed in a case where two-byte UTF8 is successively arrayed in the register r6 (S1550).

Further, the computer executes a detection procedure for detection as to whether or not three-byte UTF8 is successively arrayed in the register r6 in parallel with a conversion procedure to be executed in a case where three-byte UTF8 is successively arrayed in the register r6 (S1570). Procedures in S1500, S1510, S1550 and S1570 will be described in detail with reference to FIG. 15.

If a state where one-byte characters are successively arrayed in the register r6 is detected, the computer outputs four converted characters one by one each time it is called by another method for example (S1520). In this case, the computer converts unconverted 32-bit data in the register r6 into UTF16 (S1530) and further outputs converted four characters one by one (S1540).

If a state where two-byte characters are successively arrayed in the register r6 is detected, the computer outputs four converted characters one by one each time it is called by another method for example (S1560). If a state where three-byte characters are successively arrayed in the register r6 is detected, the computer outputs two converted characters one by one each time it is called by another method for example (S1580).

If character codes of any data size are not successively arrayed in the register r6, the computer performs a procedure according to a series of instructions prepared in advance to convert the character coding system without using the UTF81 to UTF16 instruction or the like (S1590) and outputs conversion results one by one (S1595).

Thus, in the procedure in this figure, if UTF8 character codes equal in data size are successively arrayed in 64-bit unit data, these character codes are collectively converted into UTF16. Thus, the efficiency of a conversion procedure can be improved in a case where character codes equal in data size are successively arrayed. For example, in a case where one-byte UTF8 characters are successively arrayed, a procedure progresses in the path indicated by the thick line in this figure to enable 8-character character codes to be converted by once reading out the data. This is advantageous in terms of efficiency. In this manner, a document such as an XML document in which one-byte UTF8 characters successively arrayed in a tag portion and in which particular codes representing Japanese characters are successively arrayed in a text portion can be particularly efficiently converted.

Further, according to the procedure in this figure, even in a case where a plurality of characters are converted at a time, converted characters are output one by one in response to calling from another method. There is no need to change another method which calls the procedure in this figure. Therefore, affinity with conventional programs is high.

FIG. 15 shows an example of a group of instructions 50 generated by the compiler 10 in such a manner that a conversion procedure is optimized (Embodiment 2). The acquisition procedure generation section 700 generates at the second line an instruction to perform a procedure for obtaining a character code for characters to be converted. According to this instruction, 64-bit data is read from an address designated by a register r3 to the register r6. The conversion and detection procedure generation section 710 generates at the fourth, fifth and seventh lines a series of instructions to perform in parallel each of a plurality of conversion procedures each of which should be selected and executed according to the range of the value of a character code, and a detection procedure for detecting the range of the value of the character code.

According to these instructions, a plurality of conversion procedures each of which is to be executed in a case where character codes corresponding to one of possible data sizes of UTF8 are successively arrayed in the register r6 are executed, and the results of these conversion procedures are respectively stored in registers r7, r8, and r9. Further, according to these instructions, the result of detection as to whether or not character codes corresponding to one of the data sizes are successively arrayed in the register r6 is stored in the corresponding one of a register cr0.lt, a register cr1.lt, and a register cr2.lt.

Subsequently, the selection procedure generation section 720 generates at the 11th, 13th and 22nd lines a series of instructions to perform detection as to whether or not character codes of any data size are successively arrayed in the register r6. For example, according to this series of instructions, determination is made as to whether or not a plurality of character codes differing in data size are arrayed in the register r6 and, if it is determined that such character codes are arrayed, the procedure is handed over to a series of instructions prepared in advance to convert the character coding system without using an instruction such as UTF81 to UTF16.

The selection procedure generation section 720 also generates at the 9th, 15th and 20th lines a series of instructions to select and output the procedure results of one of the plurality of conversion procedures on the basis of the detection result of a detection procedure. According to these series of instructions, one of the registers r7, r8, and r8 is selected according to the values of the registers cr0, cr1, and cr2 and the contents of the selected register are stored in a register r4. That is, the conversion results are output to the register r4.

Preferably, the selection procedure generation section 720 generates at the 14th, 18th and 25th lines instructions to increment the register r3 indicating a character code read destination as provision for a subsequent instruction to obtain a character code. Preferably, the selection procedure generation section 720 also generates at the 10th, 17th and 21st lines instructions to count and output the number of converted characters as provision for a procedure for using converted character codes. According to these instructions, the number of converted characters is output to a register r5.

Description will be made of the number of cycles required for execution of the above-described instructions in a case where the instructions are executed by POWER4 (trademark) architecture of IBM Corporation (trademark). In this architecture, two fixed-point instructions, two branching instructions, one conditional register instruction are executed in one cycle in parallel with each other. In this architecture, the load instruction latency is three cycles.

In this architecture, the latency of an ordinary addition instruction is two cycles, and the throughput is one cycle. Accordingly, each of the instructions UTF81 to 16, UTF82 to 16 and UTF83 to 16 is assumed to have the same throughput and latency. On this assumption, the series of instructions in this figure are executed in eleven cycles. That is, according to the series of instructions in this figure, the character string of two to four UTF8 characters can be converted into a UTF16 character string in eleven cycles.

In contrast, in the example in FIG. 10, 10 cycles at the shortest are required for conversion of one character. More specifically, in the case of converting one-byte UTF8 into UTF16, a load instruction (three cycles), a comparison instruction (two cycles), a branch instruction (one cycle), a shift instruction (two cycles) and an AND instruction (two cycles) are executed. Thus, the series of instructions in this figure make it possible to improve the conversion efficiency per character in comparison with the example in FIG. 10.

The conversion and detection procedure generation section 710 may generate, as a detection procedure executed with respect to each of character code data sizes, in place of the above-described procedure, a series of instructions further including an instruction to detect which character code in unit data has one of the data sizes. In such a case, the selection procedure generation section 720 generates a series of instructions to select, among the procedure results of the conversion procedure corresponding to the detection procedure, the procedure results, only the procedure results related to the character code detected as one having the corresponding data size by the detection procedure, and to output the selected procedure results. In such a case, the processing speed can be increased not only in the case where character codes of one size are arrayed in the unit data but also in the case where character codes of different sizes are arrayed in the unit data.

Referring to this figure, the conversion results of each conversion procedure are selected according to the values of the register cr0.lt, the register cr1.lt and the register cr2.lt and are output to the register r4. The arrangement may alternatively be such that the procedure results of the conversion procedures are stored at consecutive addresses in a storage area and the procedure results obtained from the address determined according to the detection procedure result are output to the register r4. That is, in this case, the conversion and detection procedure generation section 710 generates a series of instructions to store the procedure results of the plurality of conversion procedures in storage areas which are determined in advance in correspondence with the conversion procedures. The selection procedure generation section 720 generates a series of instructions to generate, on the basis of the range of the value of the character code detected by a detection procedure, the address of the storage area in which the procedure results to be read out are stored, and to read out the procedure results from the generated address. In this case, procedures for reading the procedure results to the register r4 can be collectively performed by one instruction.

FIG. 16 shows an example of a hardware configuration of a computer 500 which functions as the compiler 10 or the compiler 70. The computer 500 has a CPU peripheral section having a CPU 80, a RAM 1720, a graphic controller 1775 and a display device 1780 connected to each other by a host controller 1782, an input/output section having a communication interface 1730, a hard disk drive 1740 and a CD-ROM drive 1760 connected to the host controller 1782 by an input/output controller 1784, and a legacy input/output section having a ROM 1710, a flexible disk drive 1750 and an input/output chip 1770 connected to the input/output controller 1784.

The host controller 1782 connects the RAM 1720, and the CPU 80 and the graphic controller 1775, which access the RAM 1720 at a high transfer rate. The CPU 80 operates on the basis of programs stored in the ROM 1710 and the RAM 1720, and controls each component. The graphic controller 1775 obtains image data generated by the CPU 80, etc., on a frame buffer provided in the RAM 1720, and displays the image data on the display device 1780. Alternatively, the graphic controller 1775 may contain therein a frame buffer for storing image data generated by the CPU 80, etc.

The input/output controller 1784 connects the host controller 1782, the communication interface 1730, which is an input/output device of a comparatively high speed, the hard disk drive 1740 and the CD-ROM drive 1760. The communication interface 1730 performs communication with external units through a network. The communication interface 1730 performs communication with a semiconductor testing machine 10. The hard disk drive 1740 stores programs and data used by the computer 500. The CD-ROM drive 1760 reads a program or data from a CD-ROM 1795 and provides the read program or data to the input/output chip 1770 via the RAM 1720.

To the input/output controller 1784 are also connected the ROM 1710 and input/output devices of a comparatively low speed, i.e., the flexible disk drive 1750 and the input/output chip 1770 or the like. The ROM 1710 stores a boot program executed by the CPU 80 at the time of startup of the computer 500, and programs, etc., dependent on the hardware of the computer 500. The flexible disk drive 1750 reads a program or data from a flexible disk 1790 and provides the read program or data to the input/output chip 1770 via the RAM 1720. The input/output chip 1770 connects the flexible disk 1790 and various input/output devices, for example, through a parallel port, a serial port, a keyboard port and a mouse port.

A program provided to the computer 500 is provided by a user in a state of being stored on a recording medium, such as the flexible disk 1790, the CD-ROM 1795, or an IC card. The program is read out from the recording medium, installed in the computer 500 via the input/output chip 1770 and/or the input/output controller 1784, and executed in the computer 500. Operations performed by the computer 500 according to a compiler program installed in the and executed by the computer 500 are the same as the operations in the compiler 10 or the compiler 70 described above with reference to FIGS. 1 through 15. Therefore, description of them will not be repeated.

The above-described programs may be stored on an external storage medium. As the recording medium, an optical recording medium such as a DVD or a PD, a magneto-optic recording medium such as an MD, a tape medium, a semiconductor memory such as an IC card, or the like can be used as well the flexible disk 1790 and the CD-ROM 1795. Also, a storage device such as a hard disk or a RAM provided in a server system connected to a special-purpose communication network or the Internet may be used as the recording medium to provide the programs to the computer 500 via the network.

While the present invention has been described with respect to the embodiments, the technical scope of the present invention is not limited to the scope described in the above description of the embodiments. It is apparent to those skilled in the art that various changes and modifications can be made in the described embodiments. It is apparent from the description in the appended claims that forms including such changes and modifications are also included in the technical scope of the present invention.

According to the above-described embodiments, a compiler, a compiler program, a recording medium, a control method and a central processing unit shown in items below can be implemented.

(Item 1) A compiler which optimizes conversion of a character coding system for a character stored in a string variable in a target program to be optimized, the compiler having a conversion instruction generation section which generates a conversion instruction to convert a character from a first character coding system to a second character coding system and to store the converted character in a string variable before each of a plurality of procedures by which the character in the string variable written in the first character coding system is read out and is used in the second character coding system, and a conversion instruction removal section which removes each of conversion instructions generated by the conversion instruction generation section if a character in the second character coding system is stored in the string variable in each of the execution paths executed before the conversion instruction.

(Item 2) The compiler described in Item 1, wherein the conversion instruction generation section generates as the conversion instruction an instruction for conversion from UTF8 which is a character coding system for characters in an XML document to UTF16 which is a character coding system used in a case where a string of characters is manipulated by the plurality of procedures written as a Java (Registered Trademark) program.

(Item 3) The compiler described in Item 1, wherein if, with respect to each of the conversion instructions generated by the conversion instruction generation section, no character in the second character coding system is stored in the string variable in one of the execution paths executed before the conversion instruction, the conversion instruction removal section generates a conversion instruction in the execution path and removes the conversion instruction to remove partial redundancy of the conversion instruction.

(Item 4) The compiler described in Item 1, wherein the string variable is generated by a constructor which secures a storage area for storing characters and which sets the character coding system, and wherein if, with respect to each of the conversion instructions generated by the conversion instruction generation section, the string variable constructor sets the string variable in the second character coding system in each of the execution paths executed before the conversion instruction, the conversion instruction removal section determines that a character in the second character coding system is stored in the string variable in the execution path.

(Item 5) The compiler described in Item 1, wherein if, with respect to each of the conversion instructions generated by the conversion instruction generation section, a method of storing in the string variable a character in the second character coding system as a return value is executed in each of the execution paths executed before the conversion instruction, the conversion instruction removal section determines that a character in the second character coding system is stored in the string variable in the execution path.

(Item 6) The compiler described in Item 5, further having a method information storage section which stores identification information on a method in which a character in the second character coding system is set as a return value, and a method recursion determination section which stores in the method information storage section identification information on a method which further has as a return value one of a character stored in the string variable set in the second character coding system by the constructor, a character already converted into the second character coding system by the conversion instruction, and a return value of the method corresponding to the identification information stored in the method information storage section, wherein if, with respect to each of the conversion instructions generated by the conversion instruction generation section, a return value of the method corresponding to the identification information stored in the method information storage section is stored in the string variable in each of the execution paths executed before the conversion instruction, the conversion instruction removal section determines that a character in the second character coding system is stored in the string variable in the execution path.

(Item 7) The compiler described in Item 1, further having a series of output procedure instructions generation section which generates, as a procedure for outputting the character stored in the string variable, a series of instructions to output the character stored in the string variable if the character stored in the string variable is a character in the first character coding system, or return the character to the first character coding system and output the character in the first character coding system if the character stored in the string variable is a character in the second character coding system.

(Item 8) A compiler which optimizes conversion of a character coding system for a character stored in a string variable in a target program to be optimized, the compiler having a character manipulating procedure generation section which executes each of a plurality of procedures by which a character in the string variable written in a first character coding system is read out and is used in a second character coding system, if the character stored in the string variable is a character in the second character coding system, and which generates a series of instructions with exceptions to allow occurrence of an exception, if the character stored in the string variable is a character in the first character coding system, and an exception handler generation section which generates an exception handler which is executed when an exception occurs, and which converts the character stored in the string variable from the first character coding system to the second character coding system, stores the converted character in the string variable, and returns to the procedure in which the exception has occurred.

(Item 9) The compiler described in Item 8, wherein the character manipulating procedure generation section generates the series of instructions with exceptions if, with respect to each of the plurality of procedures by which the character in the string variable is read out and manipulated, the probability that the character input by the procedure is a character in the second character coding system is higher than a predetermined reference probability.

(Item 10) The compiler described in Item 8, where in the string variable manages coding system information indicating which of the first character coding system and the second character coding system is the string variable, a first character storage area in which a character in the first character coding system is stored, and a second character storage area in which a character in the second character coding system is stored, and wherein the character manipulating procedure generation section generates a series of instructions which generates an exception in the series of instructions with exceptions by setting a pointer indicating the address of the second character storage area to an invalid address when a character in the first character coding system is stored in the string variable, a series of instructions which sets the address of the second character storage area to a valid address when a character in the second character coding system is stored in the string variable, and, as the series of instructions with exceptions, a series of instructions to read the second character storage area.

(Item 11) A compiler which optimizes a conversion procedure for converting from a first character coding system to a second character coding system a character stored in a string variable in a target program to be optimized, the compiler having an acquisition procedure generation section which generates a series of instructions to perform a procedure for obtaining a character code for a character to be converted, a conversion and detection procedure generation section which generates a series of instructions to execute in parallel each of a plurality of the conversion procedures one of which should be selected and executed according to the range of the value of the character code, and a detection procedure for detecting the range of the value of the character code, and a selection procedure generation section which generates a series of instructions which selects the procedure results of one of the plurality of conversion procedures according to the detection result of the detection procedure, and outputs the selected procedure results.

(Item 12) The compiler described in Item 11, wherein the data size of the character codes varies depending on the range of the value of the character code, wherein the acquisition procedure generation section generates a series of instructions to obtain unit data of a predetermined size including the character code, and wherein the conversion and detection procedure generation section generates a series of instructions to execute, in parallel with each other, with respect to the data size of the character code, a conversion procedure to be executed in a case where a plurality of character codes of the corresponding data size are successively arrayed in the unit data, and a detection procedure for detection as to whether or not a plurality of character codes of the corresponding data size are successively arrayed in the unit data.

(Item 13) The compiler described in Item 12, wherein the conversion and detection procedure generation section generates, as the detection procedure to be executed with respect to the data size of the character code, a series of instructions for further detection as to whether which character code in the unit data has the corresponding data size, and wherein the selection procedure generation section selects the procedure results with respect to the character code detected as one having the corresponding data size in the procedure results of the conversion procedure by the detection procedure, and outputs the selected procedure results.

(Item 14) The compiler described in Item 11, wherein the conversion and detection procedure generation section generates, as each of the plurality of conversion procedures, a series of instructions to store the procedure results of the conversion procedure in a storage area determined in advance in correspondence with the conversion procedure, and where in the selection procedure generation section generates, on the basis of the range of the value of the character code detected by the detection procedure, a series of instructions to generate the address for the storage area in which the procedure results obtained by converting the character code are to be stored, and read out the procedure results from the generated address.

(Item 15) A central processing unit which executes a conversion procedure for converting a character in a first character coding system varying in data size depending on the kind of the character into a character in a second character coding system, the central processing unit having an instruction to execute, in parallel with each other, with respect to the data size of the character code, the conversion procedure to be executed in a case where a plurality of character codes of the corresponding data size are successively arrayed in a register, and a detection procedure for detection as to whether or not a plurality of character codes of the corresponding data size are successively arrayed in the register.

(Item 16) A compiler program which enables a computer to function as a compiler which optimizes conversion of a character coding system for a character stored in a string variable in a target program to be optimized, the compiler program making the computer function as a conversion instruction generation section which generates a conversion instruction to convert a character from a first character coding system to a second character coding system and to store the converted character in a string variable before each of a plurality of procedures by which the character in the string variable written in the first character coding system is read out and is used in the second character coding system, and a conversion instruction removal section which removes each of conversion instructions generated by the conversion instruction generation section if a character in the second character coding system is stored in the string variable in each of the execution paths executed before the conversion instruction.

(Item 17) A compiler program which enables a computer to function as a compiler which optimizes conversion of a character coding system for a character stored in a string variable in a target program to be optimized, the compiler program making the computer function as a character manipulating procedure generation section which executes each of a plurality of procedures by which a character in the string variable written in a first character coding system is read out and is used in a second character coding system, if the character stored in the string variable is a character in the second character coding system, and which generates a series of instructions with exceptions to allow occurrence of an exception, if the character stored in the string variable is a character in the first character coding system, and an exception handler generation section which generates an exception handler which is executed when an exception occurs, and which converts the character stored in the string variable from the first character coding system to the second character coding system, stores the converted character in the string variable, and returns to the procedure in which the exception has occurred.

(Item 18) A compiler program which enables a computer to function as a compiler which optimizes a conversion procedure for converting from a first character coding system to a second character coding system a character stored in a string variable in a target program to be optimized, the compiler program making the computer function as an acquisition procedure generation section which generates a series of instructions to perform a procedure for obtaining a character code for a character to be converted, a conversion and detection procedure generation section which generates a series of instructions to execute in parallel each of a plurality of the conversion procedures one of which should be selected and executed according to the range of the value of the character code, and a detection procedure for detecting the range of the value of the character code, and a selection procedure generation section which generates a series of instructions which selects the procedure results of one of the plurality of conversion procedures on the basis of the detection result of the detection procedure, and outputs the selected procedure results.

(Item 19) A recording medium on which the compiler program described in any one of Items 16 to 18 is recorded.

(Item 20) A control method of controlling by a computer a compiler which optimizes conversion of a character coding system for a character stored in a string variable in a target program to be optimized, the method comprising, as steps performed by the computer, a conversion instruction generation step of generating a conversion instruction to convert a character from a first character coding system to a second character coding system and to store the converted character in a string variable before each of a plurality of procedures by which the character in the string variable written in the first character coding system is readout and is used in the second character coding system, and a conversion instruction removal step of removing each of conversion instructions generated in the conversion instruction generation step if a character in the second character coding system is stored in the string variable in each of the execution paths executed before the conversion instruction.

(Item 21) A control method of controlling by a computer a compiler which optimizes a conversion procedure for converting from a first character coding system to a second character coding system a character stored in a string variable in a target program to be optimized, the method comprising, as steps performed by the computer, an acquisition procedure generation step of generating a series of instructions to perform a procedure for obtaining a character code for a character to be converted, a conversion and detection procedure generation step of generating a series of instructions to execute in parallel each of a plurality of the conversion procedures one of which should be selected and executed according to the range of the value of the character code, and a detection procedure for detecting the range of the value of the character code, and a selection procedure generation step of selecting the procedure results of one of the plurality of conversion procedures according to the detection result of the detection procedure, and outputting the selected procedure results.

What is claimed, is:

1. A method for realizing a compiler device for optimizing a conversion of a character coding system of a character stored in a string variable in a target program to be optimized by a computer, comprising:

a conversion instruction generation step for generating a conversion instruction, to convert characters written by a first character coding system into a second character coding system and to store the converted characters in a string variable, said conversion instruction being generated at a position to be executed prior to each of a plurality of procedures by which the characters are read out and used in the second character coding system, and being generated due to a CPU operation of the computer; and a conversion instruction removal step, where with respect to each of conversion instructions generated by the conversion instruction generation section, the conversion instruction is removed from the target program due to the CPU operation of the computer if a character in the second character coding system is stored in the string variable in each of execution paths executed prior to the conversion instruction.

2. The method according to claim 1, wherein in the conversion instruction generation step, as a conversion instruction, an instruction for converting from UTF8, which is a character coding system for characters in XML document, to UTF16, which is a character coding system used in a case where a string is manipulated by a plurality of procedures written as a language of Java (registered trademark) program due to the CPU operation, is generated.

3. The method according to claim 1, wherein, with respect to each of the conversion instructions generated in the conversion instruction generation step, if no character in the second character coding system is stored in the string variable, in one or more but not all of the execution paths executed prior to the conversion instruction, in the conversion instruction removal step, a new conversion instruction is generated in said one or more of the execution paths and an original conversion instruction is removed due to the CPU operation.

4. The method according to claim 1, wherein
the string variable secures a storage area for storing characters and is generated by a constructor, which sets the character coding system in the string variable, and
in the conversion instruction generation step, with respect to each of the conversion instructions generated in the conversion instruction generation step, if the constructor for the string variable sets the string variable to the second character coding system in each of the execution paths executed prior to the conversion instruction, in the conversion instruction removal step, it is determined that a character in the second character coding system is stored in the string variable in said each of the execution paths due to the CPU operation.

5. The method according to claim 1, wherein,
with respect to each of the conversion instructions generated in the conversion instruction generation step, if a method for storing the character with the second character coding system to the string variable as a return value is executed in each of the execution paths executed prior to the conversion instruction, in the conversion instruction removal step, it is determined that the character with the second character coding system is stored in the string variable in said each of the execution paths, due to the CPU operation.

6. The method according to claim 5, wherein
the string variable secures a storage area for storing characters and is generated by a constructor, which sets the character coding system in the string variable, and
the method further comprising:
storing, due to the CPU operation, in a method recursion determination step, into a method information storage section, identification information on a method in which the character with the second character coding system is regarded as a returned value, if a method to be optimized has as a return value one of a character stored in the string variable for which the second character coding system is set by the constructor, a character that has already been converted into the second character coding system by the conversion instruction, and a returned value of the method corresponding to the identification information stored in the method information storage section; and
determining, due to the CPU operation, in the conversion instruction removal step, with respect to each of the conversion instructions generated in the conversion instruction generation step, that the character with the second character coding system is stored in the string variable in the execution path, if the returned value of the method corresponding to the identification information stored in the method information storage section is stored in the string variable in each of the execution paths executed prior to the conversion instruction.

7. The method according to claim 1, further comprising:
generating, in an output procedure instruction sequence generation step, an instruction sequence, which outputs the character when the character stored in the string variable is in the first character coding system, and which restores the character to the first character coding system and outputs the character when the character stored in the string variable is in the second character coding system, due to the CPU operation.

* * * * *